(12) United States Patent
Seo

(10) Patent No.: US 12,294,863 B2
(45) Date of Patent: May 6, 2025

(54) DESIGNING AND GENERATING A SUBSCRIBER IDENTITY PROFILE WITHIN A SECURE WIRELESS COMMUNICATION NETWORK AND PROVIDING THE PROFILE TO A WIRELESS DEVICE FOR USE THEREBY IN OBTAINING WIRELESS SERVICES VIA THE WIRELESS COMMUNICATION NETWORK

(71) Applicant: RIPSIM Technologies, Inc., Denver, CO (US)

(72) Inventor: Kyung M Seo, Rochester Hills, MI (US)

(73) Assignee: RIPSIM Technologies, Inc., Denver, CO (US)

( * ) Notice: Subject to any disclaimer, the term of this patent is extended or adjusted under 35 U.S.C. 154(b) by 624 days.

(21) Appl. No.: 17/566,583

(22) Filed: Dec. 30, 2021

(65) Prior Publication Data

US 2022/0232385 A1    Jul. 21, 2022

Related U.S. Application Data

(60) Provisional application No. 63/138,975, filed on Jan. 19, 2021.

(51) Int. Cl.
| | |
|---|---|
| *H04W 8/18* | (2009.01) |
| *H04W 8/20* | (2009.01) |
| *H04W 12/126* | (2021.01) |
| *H04W 12/30* | (2021.01) |

(52) U.S. Cl.
CPC ........... *H04W 12/35* (2021.01); *H04W 8/183* (2013.01); *H04W 8/205* (2013.01); *H04W 12/126* (2021.01)

(58) Field of Classification Search
CPC ..... H04W 12/35; H04W 8/183; H04W 8/205; H04W 12/126
See application file for complete search history.

(56) References Cited

U.S. PATENT DOCUMENTS

| | | | |
|---|---|---|---|
| 10,791,459 B1 * | 9/2020 | Hu | H04W 8/245 |
| 10,880,711 B1 * | 12/2020 | Holmes | H04L 67/30 |
| 11,115,810 B1 * | 9/2021 | Indurkar | H04W 12/72 |
| 11,129,026 B1 * | 9/2021 | Chauhan | H04W 52/143 |
| 2018/0294949 A1 * | 10/2018 | Yang | H04W 12/106 |
| 2023/0354026 A1 * | 11/2023 | Mittal | H04W 12/0433 |

\* cited by examiner

*Primary Examiner* — Barry W Taylor
(74) *Attorney, Agent, or Firm* — John L. Doughty; Doughty Law, L.L.C.

(57) ABSTRACT eSIM software for creating eSIMs running within a trusted, secure private network of a wireless communication services provider ("WSP") receives information entered by a user via a user interface to create or modify eSIM profile templates. Information entered by a user via another user interface is used to generate a requested quantity of eSIMs based on an eSIM profile template. The software provides generated eSIMs to components of the network that already exist for wirelessly distributing eSIMs to user equipment devices. Software interfaces facilitate access to sensitive information of the WSP in creating or modifying the templates, for generating eSIMs based thereon, and for storing generated eSIMs for distribution to user equipment. Transport of highly guarded security information, like master keys, outside of the secure private network does not occur. Real-time alerts notify that user-entered mismatched data precludes generation of eSIMs that will function in authenticating to the network.

15 Claims, 14 Drawing Sheets

ADMINISTRATIVE USER INTERFACE LOGIN PAGE EXAMPLE

ADMINISTRATIVE USER INTERFACE DATA ENTRY PAGE
FOR ENTERING NETWORK AUTHENTICATION

ADMINISTRATIVE USER INTERFACE LANDING PAGE

STARTING PAGE OF ESIM PROFILE CREATION TOOL USER INTERFACE

DATA ENTRY SCREEN OF ESIM PROFILE CREATION TOOL USER INTERFACE IN WIZARD MODE

FIG. 10 STARTING PAGE OF ESIM GENERATION TOOL USER INTERFACE

STATUS DASHBOARD OF eSIM GENERATION TOOL

DESIGNING AND GENERATING A SUBSCRIBER IDENTITY PROFILE WITHIN A SECURE WIRELESS COMMUNICATION NETWORK AND PROVIDING THE PROFILE TO A WIRELESS DEVICE FOR USE THEREBY IN OBTAINING WIRELESS SERVICES VIA THE WIRELESS COMMUNICATION NETWORK

CROSS REFERENCE TO RELATED APPLICATION

This application claims priority under 35 U.S.C. 119(e) to U.S. provisional patent application No. 63/138,975 entitled "Browser-based eSIM Profile Methodology and Process," which was filed Jan. 19, 2021, and which is incorporated herein by reference in its entirety.

FIELD

Designing and generating a Subscriber Identity profile (also known as an "eSIM profile") within a secure communication network operated by a wireless service provider and transmitting said Subscriber Identity profile to a wireless user equipment device for use by said wireless user equipment device for authenticating to the secure wireless communication network and for accessing services via the secure wireless communication network.

BACKGROUND

A "SIM Card" has software and software applications on it which are intricately tied to the hardware manufacturing process. The plug-in SIM Card hardware has been miniaturizing over the past 30 years with embedded SIM Cards coming into use about ten years ago in 2010. The embedded form factor of the hardware SIM was a game-changer and uses an Over-the-Air ("OTA") update capability of the software applications. One of the software applications may be referred to as an eSIM, or an eSIM profile, which may contain secure credentials unique to each Wireless Service Provider ("WSP") globally.

An eSIM is the electronic or digital SIM software that has the network authentication keys. It is the evolution of the SIM software that goes on an embedded UICC or integrated UICC (the secure hardware) in a device. eSIM is decoupled from the secure hardware now, not preloaded onto the hardware during the manufacturing process.

The technology being used to produce the SIM software and applications has not changed much in 30 years' time since the launch of the "SIM Card" in 1991. WSPs wait one or more month(s) to receive new eSIMs, or eSIM profiles, from current SIM vendors and the WSPs have to repeat the work and processes with multiple vendors because of eSIM profile information being inextricably linked to corresponding vendor's hardware (i.e., an eUICC). WSPs also typically manage costly rework caused by human error of current SIM vendors that still employ manual processes in generating eSIMs.

The business models have also not changed much in 30 years' time and the current business models are not going to be sustainable with the impending SIM Card hardware obsolescence.

Finally, new data security and privacy regulations globally are changing to require security-related data to be kept in-country. Incumbent SIM vendors cannot manage, without high cost and difficulty, myriad changing regulations as this typically requires building local brick-and-mortar presence, or at least, data center presence, in each country to comply with such regulations.

Thus, there is a need for solutions that eliminate the reliance on third-party SIM vendors creating eSIM profiles and software, and transmitting said profiles and software over a network, such as the World Wide Web or the Internet, to a WSP's secure private network (i.e., a WSP's trusted network environment that no device or entity can access without permission/credentials provided by or from the WSP).

SUMMARY

In an aspect, the hardware portion, or form, of a UICC may be incorporated into a baseband processor chip (i.e., an integrated UICC or iUICC) or some other form of embedded Secure Element of a wireless user device in future to save space on printed circuit boards within the devices. To facilitate, and make use of this capability, an intuitive software solution may be placed in the hands of, and controlled by, a WSP. Examples of a WSP include, but are not limited to, the types of operators listed below in the Acronyms/Definitions section. The WSP may use the eSIM designing and generating software solution to create eSIM profile templates and generate eSIM profiles in a novel, fast, safe, and easy way. The eSIM designing and generating software solution may include the following components or modules: an intuitive online profile creation wizard (online with respect to the WSP secure private network but still not accessible by, nor having access to, a communication network outside of the WSP secure private network) that steps a WSP user through the creating of a new eSIM profile template; an eSIM profile generation/data processing module that automatically generates eSIM profiles in one streamlined step, typically with a click of a software button; and a WSP cloud-based secure server (maintained within the WSP private network not accessible by, and not having access to, a communication network outside of the private WSP private network) that stores and sends eSIM profiles on a real-time, as-needed basis to wireless mobile user equipment devices that need to authenticate and connect to the WSP's network.

As described herein, a WSP, or an authorized employee thereof, can quickly, easily, and securely cause the creation of as many or as few eSIM profiles as the WSP needs for its UICCs, eUICCs, iUICCs, or any future version of the secure element. The WSP, or trusted user/employee thereof, may use an intuitive, easy-to-use, and novel secure browser-based user interface tool to define, create, and package an eSIM profile, or eSIM profile information, within a secure, private network of a WSP without needing information or data from outside the private network and without sending information or data from the private network to a device, component, or network element outside of the WSP's private network.

An eSIM, or eSIM profile is the unique software of each Wireless Service Provider (WSP) that enables authentication and secure connectivity of a device to the WSP's network. Also known as the digital SIM (as opposed to the physical SIM Card), the eSIM profile is loaded over-the-air ("OTA") to a secure element in a device and may be added or removed, enabled, or disabled, and updated on the secure element during the lifetime of a device. It will be appreciated that use of the term 'eSIM' in describing novel aspects herein may refer to an eSIM profile and may not be a reference to an embedded SIM.

In an aspect, a method comprises receiving one or more wireless subscriber eSIM profile template parameter selections via a user interface running on a user data entry computer device coupled to a trusted, private network of a wireless service provider. The trusted, secure private network may be defined by one or more firewalls and other techniques that may be software-based or that may be hardware based. The firewalls or other techniques may be configured to prevent ingress to or egress from the trusted, secure private network of highly guarded data or information that the wireless service provider wishes to protect from, and remain secure from, the outside world (i.e., from users and devices that it has not granted permission to access the highly guarded or protected information for data). The user data entry computer device may be a personal computer, a tablet, a smartphone, and the like, and may be referred to as a computer device, or component, that is part of an administrative user system. The user interface may be referred to as an administrative user interface. The user interface may include a browser-based eSIM Profile Creation Tool user interface. The method may comprise automatically selecting a wireless subscriber eSIM profile template based on the wireless eSIM profile template parameter selections. It will be appreciated that use of the term 'automatically' in the previous sentence may include selecting a profile template based on data or information that a user enters such that when inconsistencies occur among data or information that the user enters with respect to a possible template that can be created, or modified, the user may be presented with an error message informing him, or her, that one or more pieces of information entered does not fit with other information already entered. For example, if a user enters a piece of information that corresponds only to a machine-to-machine wireless device, but then enters a piece of information that corresponds to a consumer wireless communication device, the user may be presented with an error message informing him, or her, of such mismatch. The term 'automatically' may also refer to the determining, using a computer program running on a network computer, of an eSIM profile template based on information and data entered by a user upon the user selecting a button, 'hitting enter', or other such entry that causes a computer to perform an action in response thereto.

The wireless eSIM profile template parameter selections may include Onboarding Data. Examples of Onboarding Data parameters are given below in Table 1 and Table 4. The method may include generating a wireless subscriber eSIM profile according to the wireless subscriber eSIM profile template, wherein the wireless subscriber eSIM profile includes subscriber information that corresponds (typically uniquely) to a particular subscriber for use by a wireless subscriber device of the particular subscriber in wirelessly obtaining one or more services from the secure private network of the wireless service provider. It will be appreciated that more than one eSIM profile may be generated depending on a quantity specified by a user that may be using a user interface provided by an eSIM generating tool to cause the generating of the one or more eSIM profiles. The method may involve the eSIM generating tool causing the storing of the wireless subscriber eSIM profile, or profiles, at a network system component of the private network of the wireless service provider for future download from within the wireless service provider's secure private network to a wireless subscriber device corresponding to the wireless subscriber eSIM profile. The one or more eSIM profiles need not be downloaded at once, or as a batch, to corresponding wireless devices in the field, although batch download from the download server to some of, or all of, the corresponding wireless device in the field is an aspect.

In an aspect, the subscriber information includes network authentication credential information for use in authenticating a wireless device to the secure private network of the wireless service provider. For example, WSP secret keys and one or more encryption keys are stored securely inside one or more components of the wireless service provider's trusted secure private network. An example of such a component may include a hardware security module.

In an aspect, the receiving of the wireless subscriber eSIM profile template parameter selections, the automatic selecting of the wireless subscriber eSIM profile template, the generating of the wireless subscriber eSIM profile, and the causing of the storing of the wireless subscriber eSIM profile are performed by one or more components of the private network of the wireless service provider that are not accessible by computer devices that are not components of the private network of the wireless service provider.

In an aspect, one or more components of the private network of the wireless service provider that are not accessible by computer devices that are not components of the private network of the wireless service provider may be one or more of: an SM-DP/SM-SR/SM-DP+ component, an HLR/HSS/UDM component, a SIM OTA component, or an OSS/BSS component.

In an aspect, one or more wireless subscriber eSIM profile template parameters may include one or more of: Profile Header, Master File, CD, PINCodes, PUKCodes, TELECOM, USIM, OPT-USIM, Phonebook, GSM-Access, 5GS, SAIP, ISIM, OPT-ISIM, EAP, GenericFileManagement, AKAParameter, SecurityDomain, Application, Remote File Management, NonStandard or End.

In an aspect, a user application running on a user data entry computer device provides the user interface that receives the onboarding data and the eSIM profile template parameter selections from a user. In an aspect the user application running on the user data entry computer device may be a browser. The browser may be able, capable of, or configure to, access, display, or interact with a web page that may be provided by, or hosted by, an eSIM application running on a computer component that is part of a wireless service provider's trusted secure private network. An example of an eSIM application may be an eSIM Profile Creation Tool User Interface. Another example of an eSIM application may be an eSIM Generation Tool User Interface.

In an aspect, a system for generating eSIM profiles within a wireless service provider's trusted, secure private network is provided. Certain secure information, such as Input Data, is maintained within the trusted, secure private network of the wireless service provider and may be used for the generation of the eSIM profiles without the certain secure information leaving the secure private network. In an aspect, the system comprises a secure computer component, operating within the secure private network and being logically isolated from computer components outside of the trusted, secure private network that includes one or more processors. The one or more processors may be instructed by the eSIM generation tool to perform operations such as provide an interface for receiving one or more wireless subscriber eSIM profile template parameter selections via a user interface running on a user data entry computer device coupled to the secure private network of a wireless service provider. The one or more processors may be instructed by the eSIM generation tool to provide an eSIM generation tool user interface. The eSIM generation tool, or the one or more processors instructed thereby, may be configured to use a selected wireless subscriber eSIM profile template determined based on wireless eSIM profile template parameter selections, or information entered by a user into the user interface provided by the eSIM generation tool. In an aspect the one or more processors may be instructed by the eSIM generation tool to generate a wireless subscriber eSIM according to the selected wireless subscriber eSIM profile template, wherein the wireless subscriber eSIM includes subscriber information that corresponds to a particular subscriber for use by a wireless subscriber device of said particular subscriber to wirelessly obtain one or more services from the trusted, secure private network of the wireless service provider. The one or more processors may be instructed by the eSIM generation tool to cause the storing of the wireless subscriber eSIM profile at a network system component coupled within the secure private network of the wireless service provider for wireless download to a wireless subscriber device corresponding to the wireless subscriber eSIM profile.

In an aspect, secure information of the wireless service provider that is used for the generation of the eSIM profiles that does not leave the secure private network includes Input Data retrieved under instruction from the eSIM generation tool from a WSP Input Data server that is only accessible from within the trusted, secure network of the wireless service provider.

In an aspect, Input Data is received by a computer component that includes the one or more processors from an Input Data server via an Input Data interface, wherein the computer component that includes the one or more processors, the Input Data server, and the Input Data interface are coupled within, operate within, and are not accessible from without the trusted, secure private network.

In an aspect, an Input Data adapter/interface includes an API. For examples, the API of an Input data adapter/interface may be implemented as a REST API or as a SOAP API. Different API protocols may be used to accommodate requirements that may vary from one WSP to another WSP.

In an aspect, network system components coupled within the secure private network of the wireless service provider for wireless download to a wireless subscriber device corresponding to the wireless subscriber eSIM profile may be one or more of: an HLR/HSS/UDM, an SM-DP+/SM-DP/SM-SR, an SIM-OTA or an OSS/BSS component.

In an aspect the computer component operating within the secure private network and that is logically isolated from computer components outside the secure private network and that includes one or more processors, generates a wireless subscriber eSIM profile according to a selected wireless subscriber eSIM profile template and causes the storing of the wireless subscriber eSIM profile at a network system component coupled within the secure private network of the wireless service provider for wireless download to a wireless subscriber device corresponding to the wireless subscriber eSIM profile a predetermined number of times for a predetermined plurality of eSIM profiles, wherein each eSIM profile includes data that is unique with respect to each of the other of the plurality of eSIM profiles. For example, a user may enter a quantity of 100 into an eSIM generation tool user interface dialog box, such as an alphanumeric text/value field, a dropdown box, a radio button, and the like. The eSIM generating tool would then generate 100 eSIM profiles with eSIM profile data populating a plurality of parameter fields as specified by an eSIM profile template selected to be used for the generation of the 100 eSIM profiles. The eSIM profile data typically includes information that is respectively unique to each respective eSIM generated, which facilitates the identifying and authenticating to the trusted, secure private network of the WSP of a given wireless user device to which the eSIM profile has been downloaded.

In an aspect, a system comprises an eSIM generation tool running on a computer device within a trusted, secure private network of a wireless service provider. The eSIM generation tool may be referred to as an eSIM generation engine or eSIM generation module and may be a component, typically a software/application component, of an eSIM designing and generating system, that also may include other software and applications that may be used for onboarding data and creating profile templates to enable generation of one or more eSIMs within a WSP's trusted, secure private network.

In an aspect, the eSIM generation tool may use a selected wireless subscriber eSIM profile template that is created with, at least partially, onboarding data entered by a first user via an eSIM Profile Creation Tool user interface. The eSIM generation tool may generate, in response to information entered by a second user via an eSIM Generation Tool User Interface that is hosted by a computer device operable within the secure private network of the wireless service provider, a wireless subscriber eSIM according to the selected wireless subscriber eSIM profile template, wherein the wireless subscriber eSIM includes subscriber information that corresponds to a particular subscriber for use by a wireless subscriber device of the particular subscriber to wirelessly obtain one or more services from the secure private network of the wireless service provider. The eSIM generation tool may cause the storing of the wireless subscriber eSIM profile at, or to, a network system component operable, coupled within, part of, or otherwise accessible from within the trusted, secure private network of the wireless service provider for wireless download to a wireless subscriber device corresponding to the wireless subscriber eSIM profile. Correspondence between the eSIM profile and the wireless user device to which it corresponds may be based on a value, number, or other identifier that is unique to the wireless user device and the eSIM, respectively, for example the pairing of the IMEI of the wireless user device and the ICCID of the eSIM profile.

In an aspect the first user may be a high security user and the second user may not be a high security user. In an aspect, the first and second users may both be high security users. In an aspect, the first and second users may be the same high security user.

In an aspect a hardware security module interface may be used between the eSIM generation tool and a hardware security module ("HSM"), wherein the hardware security module interface and the hardware security module are operated within, and are not accessible from without, the secure private network of the wireless service provider. The hardware security module interface may provide an interface to a WSP's HSM such that the eSIM generation tool can interact with the HSM to obtain key material therewith, whereas a third-party eSIM vendor that creates eSIM profiles outside of the WSP's secure private network would not have access to the WSP's hardware security module.

In an aspect, the eSIM generation tool generates a plurality of eSIM profiles according to a quantity entered by the second user via the eSIM Generation Tool User Interface and wherein the eSIM generation tool causes the storing of the plurality of eSIM profiles to a network system component, wherein the network system component is one or more of: an HLR/HSS/UDM, an SM-DP+/SM-DP/SM-SR, an SIM-OTA, or an OSS/BSS component.

DETAILED DESCRIPTION OF THE DRAWINGS

Figure 1:
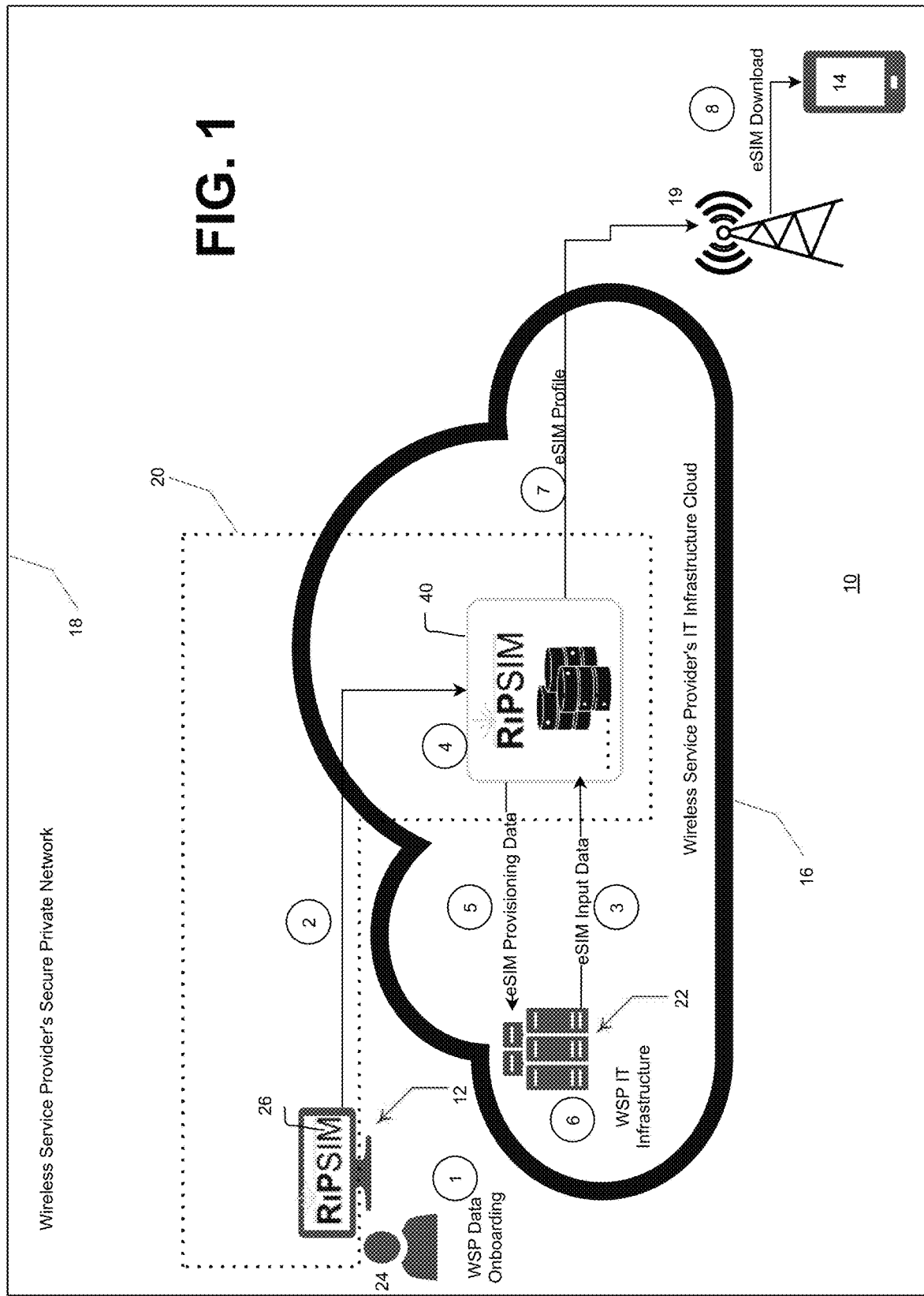
FIG. 1 illustrates a system for designing and generating an eSIM profile within a WSP private network without sharing of information with an entity that is outside of the private network, and for delivering the eSIM to a wireless user device for use by the device in accessing the private network and services therefrom.

As a preliminary matter, it will be readily understood by those persons skilled in the art that the present embodiments are susceptible of broad utility and application. Many methods, embodiments, and adaptations other than those herein described as well as many variations, modifications and equivalent arrangements, will be apparent from or reasonably suggested by the substance or scope of the present embodiments.

Accordingly, while embodiments have been described herein in detail in relation to preferred embodiments, it is to be understood that this disclosure is only illustrative and exemplary and is made merely for the purposes of providing a full and enabling disclosure. The following disclosure is not intended nor is to be construed to limit embodiments or otherwise exclude any such other embodiments, adaptations, variations, modifications and equivalent arrangements, embodiments being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Acronyms/Definitions 1. eSIM profile or eSIM—an electronic SIM profile comprises software, information, data, algorithms, or applications that may be unique for each Wireless Service Provider (WSP) and that may uniquely enable authentication and secure connectivity of a given wireless communication device (some of the eSIM corresponds uniquely to a particular wireless user device that it is stored in), such as a smartphone, a tablet, a smart watch, an Internet of Things ("IoT") device, a machine-to-machine ("M2M") device, and the like to the WSP's network. Also known as the digital SIM (as opposed to the physical SIM Card), the eSIM profile is loaded over-the-air (OTA) to a secure element in a device and may be added or removed, enabled or disabled, and updated on the Secure Element ("SE") during the lifetime of a device.
2. Profile Package—A personalized eSIM profile using an interoperable description format (i.e., Trusted Connectivity Alliance eUICC Profile Package: Interoperable Format Technical Specification) transmitted to an embedded Secure Element ("eSE") or Secure Element ("SE"). Profile Package indicates a specific format of an eSIM profile to load and install in an eSE or SE while eSIM profile is a generic term irrespective of a format or state (e.g., generated, loaded, installed, enabled, disabled, etc).
3. eSE or SE—the embedded Secure Element or Secure Element refers to the secure hardware used in a device to connect to wireless networks. The eSE/SE ensures the integrity and security of many types of personal data on devices. The Secure Element may include a discrete hardware component, such as a Universal Integrated Circuit Card ("UICC"), an embedded UICC (e.g., a UICC that is permanently connected/soldered to a circuit board of a wireless user device), or may be an integrated secure element, such as a memory, or a system-on-chip, of a baseband processor chip designed to store eSIM profile information, data, applications, and algorithm (e.g. an iUICC).
4. HLR-Home Location Register is a core component that a WSP uses to provide mobile services over 2G/GSM and 3G/UMTS networks. It includes a database that contains various information about all of the mobile subscribers of a mobile network, such as the mobile numbers, services subscribed to, whether the numbers have been ported to another network, and similar information.
5. HSS—Home Subscriber Server is an evolution of the HLR; it is found in IMS 4G/LTE networks. It is the concatenation of the HLR (Home Location Register) and the AuC (Authentication Center)—two functions present in pre-IMS 2G/GSM and 3G/UMTS networks.
6. UDM—User Data Management is the 5G core network component equivalent to an HLR or HSS.
7. SIM OTA—Over-The-Air (OTA) is a technology that updates or changes data in secure elements. OTA enables a WSP to introduce new services or modify content of secure elements in a rapid and cost-effective way.
8. SM-DP or SM-DP+—Subscription Manager Data Preparation. This is the entity which WSPs use to securely encrypt and store their credentials for OTA installation within a secure element in a device. SM-DP+ is present in Consumer Remote SIM Provisioning (RSP) architecture and extends the role of SM-DP of the M2M Remote SIM Provisioning architecture to perform OTA delivery of eSIM.
9. OSS/BSS—Operation Support System/Business Support System are core components of a WSP's IT infrastructure that manage the operations and business aspects of the network. OSS encompasses order management, network inventory management and network operations. BSS encompasses order capture, customer service and billing
10. K or Ki—the secret key used in symmetric key generation by a WSP; also known as the Subscriber key. It is part of the required information in Milenage or TUAK algorithm to enable authentication and connection of a device to WSP's network.
11. OP—the Operator code that is unique to each WSP. It is used in 3G, 4G, and 5G key generation algorithms.
12. TOP—the equivalent of OP in the TUAK authentication algorithm.
13. Opc—the derived key that is generated from the WSP's operator code (OP) and secret key (K) which is unique to each secure element. Used in the authentication and key agreement process to WSP's network.
14. MILENAGE—an authentication algorithm set specified by the 3GPP that specifies authentication and key generation functions. Milenage specification is 3GPP TS 35.206.
15. TUAK—an authentication algorithm set for the 3GPP authentication and key generation functions. TUAK specification is 3GPP TS 135 231.
16. R—the Rotation Constants used in Milenage functions.
17. C—the XORing Constants used in Milenage functions.
18. PIN—Personal Identification Number. A secret number that can be used in mobile devices.
19. PUK—PIN Unlock or Unblock Key is the code required by a user to reset the PIN.
20. SIM—Subscriber Identity Module. The SIM application is the unique software of each Wireless Service Provider (WSP) that enables authentication and secure connectivity of a device to the WSP's 2G network. Precursor to the eSIM profile or eSIM application.
21. USIM—Universal SIM. The USIM application arrived with the advent of 3G networks; USIM supports more secure network authentication algorithms such as Milenage, which is based on mutual authentication between a User Equipment (UE) device and network components.
22. ISIM—IP Multimedia Services SIM. The ISIM arrived with the advent of IMS networks; the ISIM application can co-exist with the USIM application on the same secure element making it possible to use in both types of networks.
23. IMPI—IP Multimedia Private Identity is a global identity allocated by the home network. IMPI contains home operator's domain information as part of an ISIM application.
24. IMPU—IP Multimedia Public identity acts like a telephone number on an ISIM application.
25. HSM—Hardware Security Module is a physical computing device/server that safeguards and manages digital keys, performs encryption and decryption functions for digital signatures, strong authentication, and other cryptographic functions.
26. ICCID—Integrated Circuit Card Identifier. Up to 22-digit number that uniquely identifies each secure element. EID or EUICC ID is the equivalent of ICCID for embedded secure elements.
27. IMSI—International Mobile Subscriber Identity. 15-digit unique identifying number issued by the WSP that is used to identify the subscriber to the WSP's service. IMSI consists of the following three:
a. MCC: Mobile Country Code—identifies geographic region of the secure element
b. MNC: Mobile Network Code—identifies the WSP
c. MSIN: Mobile Subscriber Identifier—identifies individual subscriber
28. MSISDN—is the telephone number uniquely identifying a subscription in a GSM or UMTS network. It is the mapping of the telephone number to the secure element in a mobile or cellular device at the time of subscription activation.
29. SUCI—Subscription Concealed Identifier is a privacy preserving identifier containing the concealed SUPI introduced in 5G networks.
30. SUPI—Subscription Permanent Identifier is the 5G equivalent of IMSI. SUPI can be also formatted in NAI (Network Access Identifier).
31. Profile Element (PE)—a part of the eSIM Profile representing one or several features of the Profile encoded using TLV structures based on ASN.1 description; referenced in "eUICC Profile Package: Interoperable Format Technical Specification" of the Trusted Connectivity Alliance.
32. Wireless Service Provider—encompasses Mobile Network Operators (MNOs), Mobile Virtual Network Operators (MVNOs), IoT Connectivity Service Providers, (CSPs) Citizens Broadband Radio Service (CBRS) network operators, private Long-Term Evolution (LTE) network operators, and any future types of network operators that provide wireless services.
33. WSP Input Data—information such as ICCIDs and IMSIs that are used to generate unique data for each and every eSIM profile. See 'Input Data' section below for further details.
34. WSP secure private network—a communication network that provides voice and data services, among other types of services, to mobile wireless devices/subscribers. The secure private network typically has a radio access network that includes base stations/network nodes (i.e., Node B, eNode B, gNode B) to which mobile devices are able to connect once authenticated via the WSP's core network components such as HLR/HSS/UDM. The secure private network typically also includes a large IT infrastructure to operate the network and manage the devices on the network. Security of the network core components, IT infrastructure, and mobile devices is multi-layered and crucial to the operation of the private network. A WSP may secure, or logically isolate, its secure private network using techniques such as the following provided as examples: encryption, random key generation, firewalls, and myriad cybersecurity tools, among others.

A method and system for designing and generating eSIM profiles within a WSP secure private network and for delivering the eSIM profiles to wireless user devices for use in authenticating to and accessing services from a WSP's private network includes two main software pillars, an eSIM Profile Creation Tool (e.g., eWIZ, the software application for onboarding WSP data and creating eSIM profile templates as provided by RiPSIM Technologies, Inc. ("RiPSIM")) and an eSIM Generation Tool (e.g., E.D.G.A.R., the eSIM profile generation software application as provided by RiPSIM).

An administrative user interface ("UI") may include two browser-based user interfaces: the first being the eSIM Profile Creation Tool User Interface (eWIZ UI in RiPSIM parlance) that allows a user to enter data and build an eSIM profile template based on the user's proficiency level. For example, a 'Wizard Mode' provides step-by-step guidance via an adaptive questionnaire and an 'Expert Mode' gives the full control of building an eSIM Profile Template and its configuration to the user. The second UI being the eSIM Generation Tool User Interface (E.D.G.A.R. UI in RiPSIM parlance) which enables a user to generate eSIMs based on an eSIM profile template defined via the eSIM Profile Creation Tool User Interface.

The eSIM Generation Tool may include a software component that interfaces with external (but still within a WSP's private network) entities at the WSP, for example the WSP's OSS/BSS systems. The core functionalities of the eSIM Generation Tool include: generating eSIMs based on data entered via the eSIM Generation Tool User Interface; and distributing eSIMs and output data that are based thereon to the WSP's provisioning/distribution components such as HLR/HSS/UDM, SIM-OTA, SM-DP/SM-SR/SM-DP+, and any other systems that provision or deliver network credentials. The eSIM Generation Tool generates eSIMs according to the wireless industry specifications.

Figure 3:
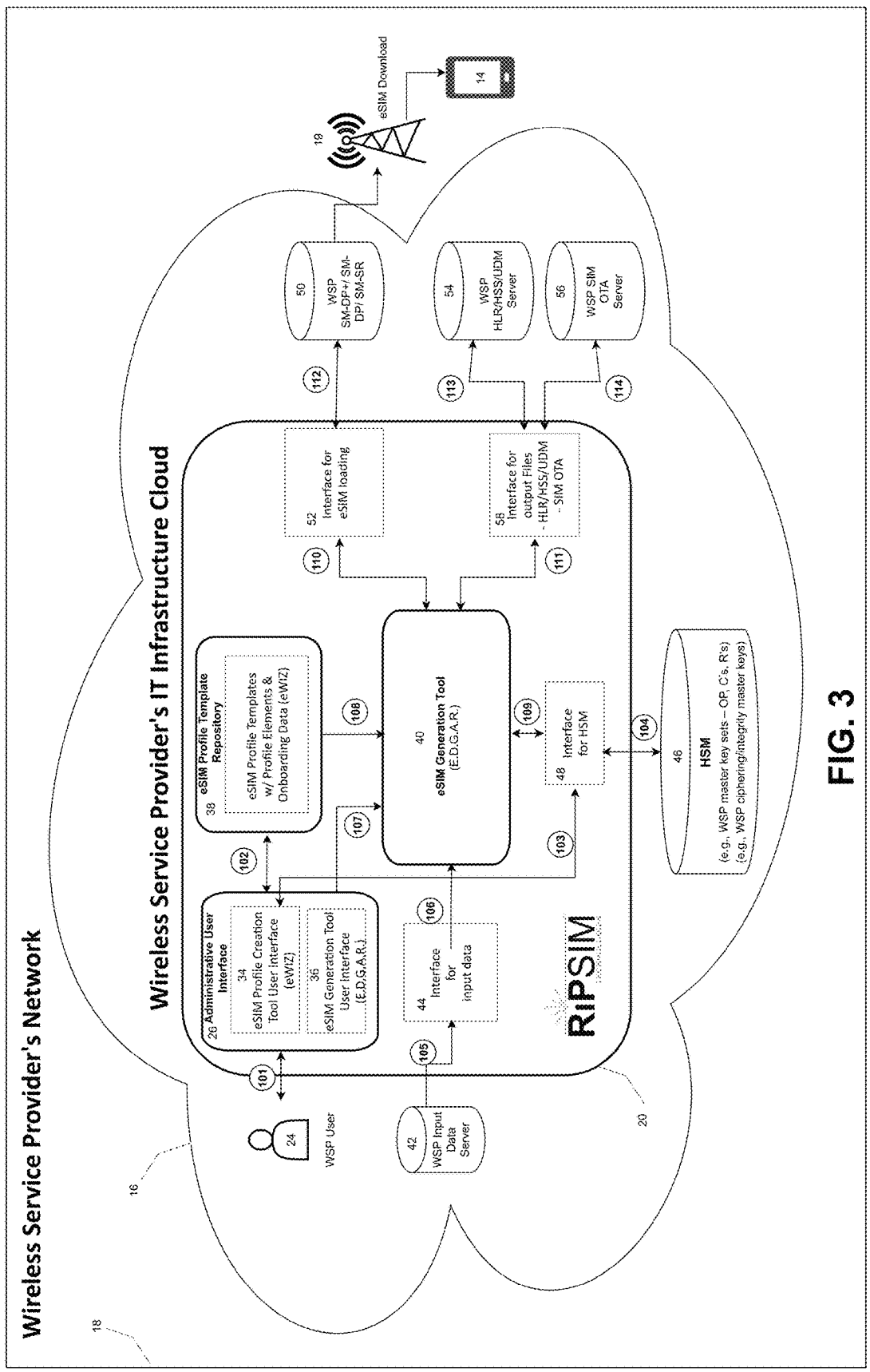
FIG. 3 illustrates components of an eSIM designing and generating system that are part of a WSP private communication network and that are not accessible from devices, system components, or networks that are not part of, are not authorized to be part of, or do not access any part or component of, the WSP private communication network.
Figure 4:
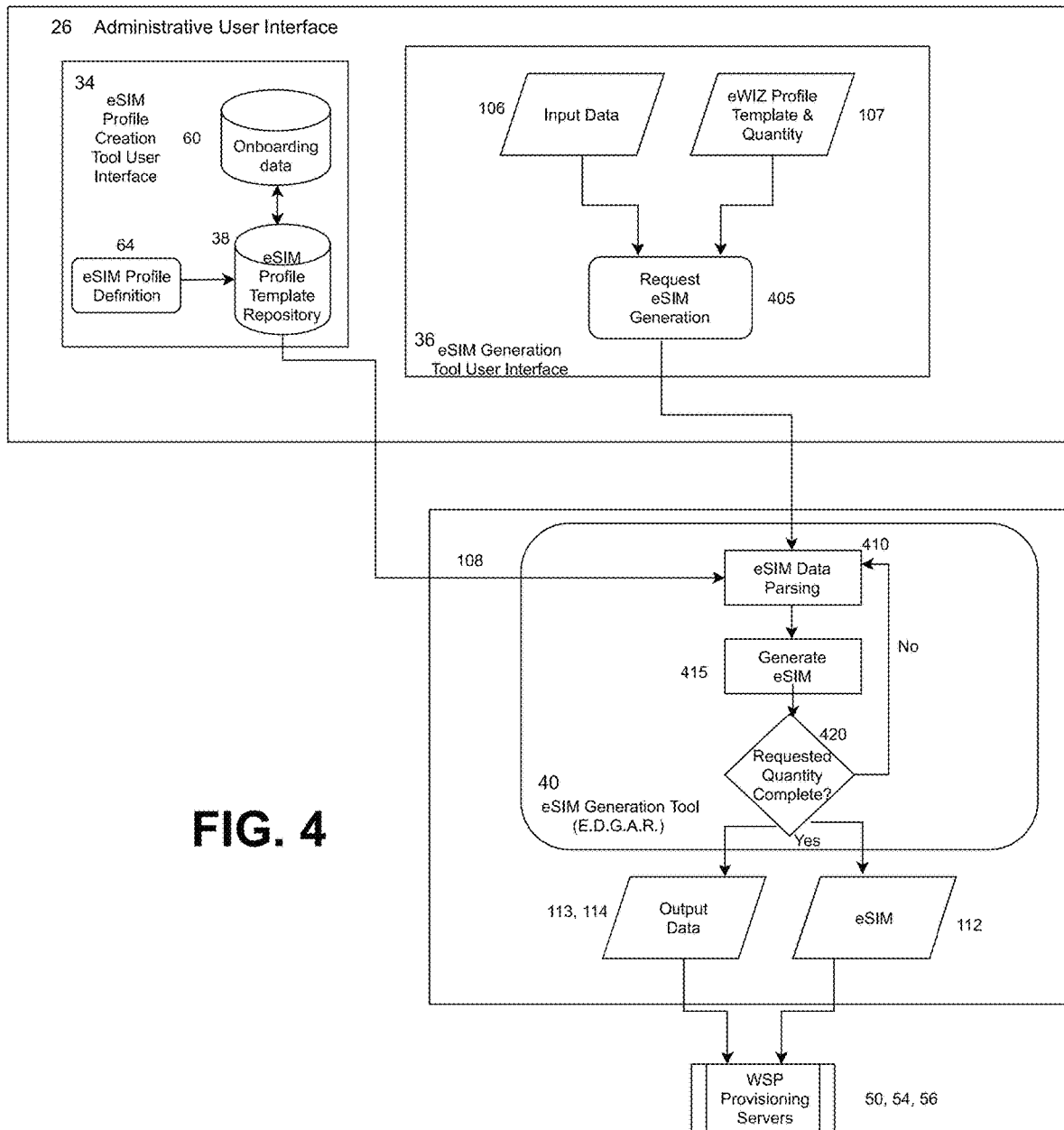
FIG. 4 illustrates at a high level the administrative user interface and eSIM Generation Tool as a block diagram of an eSIM designing and generating system.

FIGS. 3 and 4 illustrate an overall system and process of designing and generating eSIM profiles that involve using an eSIM Profile Creation Tool UI to gather onboarding data from the WSP user and define/store the eSIM profile templates as well as an eSIM Generation Tool UI to generate eSIMs within the eSIM Generation Tool, all of which are contained logically within a WSP's IT infrastructure of its secure private network (i.e., behind firewalls that define a WSP's private, walled-garden network that it closely guards and protects access to/from devices and systems and applications outside the network).

The eSIM Profile Creation Tool UI and the eSIM Generation Tool UI are part of the administrative user interface ("UI"). Via the administrative UI, the eSIM Profile Creation Tool and the eSIM Generation Tool each provide for an automated, novel method of designing and generating an eSIM, as described below. Currently, the common method that incumbent SIM vendors employ separates the definition of network credentials and the generation of eSIM profiles into distinct, independent steps as part of current hardware/ SIM Card manufacturing processes. Furthermore, the common method that incumbent SIM vendors employ separates the generation process of eSIM profiles into multiple steps, often at multiple geographic locations, as an extension of their current hardware/SIM Card manufacturing processes. This adaptation has created obstacles for WSPs that preclude on-demand eSIM orders, resulting in weeks of wait time between orders and receipt of eSIMs ready for download. For example, when a WSP needs a new profile, it sends an excel spreadsheet to its SIM vendors and the SIM vendors subsequently manually program their proprietary tool to create an eSIM. Thereafter the eSIM is loaded to a test SIM Card and sent to the WSP for verification. If the eSIM profile contains an error, then the SIM vendor has to re-do the entire process until the WSP approves the eSIM profile. Subsequently, when a WSP orders 50,000 eSIMs, its SIM vendor processes the order by first generating network credentials for all 50,000 eSIMs as a batch and combines the data with the eSIM Profile Template in the next step. After a few more additional steps, the whole batch of 50,000 eSIM profiles will be ready for delivery to the WSP. Typically, a single eSIM profile will not be made available until the entire batch of data is processed.

In contrast, the novel administrative user interface and software applications that provide the administrative user interface that are disclosed herein can notify, in real time (i.e., as a user is creating an eSIM profile template), a user of errors typically caused by data entry errors made by the user, and may notify the user of inconsistent, mismatching, incongruous, or out-of-place information that he, or she, may enter or select as compared to other data that he, or she, may have entered or selected. This provides a real-time error trapping of data being entered by a user during the process of creating or modifying an eSIM template. This real-time error notification may be performed by one or more of the software applications that provide the administrative user interface comparing data entered by a user to information or data stored in a component of a WSP's secure private network, in which the one or more software applications that provide the administrative user interface is/are running. The novel eSIM Generation Tool disclosed herein simplifies the WSP's experience by generating eSIM profiles in one streamlined step. Regardless of the quantity of eSIMs requested (e.g., one, fifty thousand, or more), it is possible to generate eSIM profiles according to a given WSP's needs without any transporting or transmitting of information or data between the WSP and a SIM vendor (i.e., without sensitive data of the WSP traversing a network edge of the WSP's secure private network). In case of error in requesting the generation of one or more eSIM profiles, eSIM profiles can be re-generated without reprocessing the entire batch of WSP Input Data. Thus, WSPs can be more flexible in planning eSIM demands and handling any mistakes during eSIM generation.

Using the administrative user interface (e.g., the eSIM Profile Creation Tool UI), allows a WSP user with the requisite access privileges (i.e., a high security user) to enter the most sensitive data required in an eSIM profile template. Sensitive data examples include: network authentication parameters for Milenage and TUAK authentication algorithms, the 5G Home Network Public Key, and Master Keys (a generic term to denote any master key used as a seed for key derivation). Then, via the administrative user interface, the same WSP user, or another WSP user, may build an eSIM profile template using 'Wizard Mode' (step-by-step guidance via an adaptive questionnaire) or 'Expert Mode'. Next, via the eSIM Generation Tool UI, the same WSP user, or another WSP user, may request one, several, or many eSIMs to be generated by the eSIM Generation Tool. The eSIM Generation Tool generates an eSIM by parsing through the selected eSIM Profile Template and inserting dynamically generated data that is unique to each eSIM/eSIM profile. At the end of one iteration, the eSIM Generation Tool has produced an eSIM profile preferably according to standard requirements of the Trusted Connectivity Alliance. The eSIM Generation Tool may repeat this process until it reaches the quantity of eSIM profiles indicated by a requested quantity entered using the eSIM Generation Tool User Interface. It will be appreciated that each eSIM is unique and corresponds to unique entries in a file of Input Data (i.e., an Input Data file) that is maintained by the WSP. Accordingly, because a given WSP maintains its Input Data file, the WSP does not have to risk transmitting its sensitive Input Data outside of its secure private network because the eSIM Generation Tool accesses Input Data from within the WSP's secure private network without the Input Data having to traverse a network edge of the secure private network.

Figure 10:
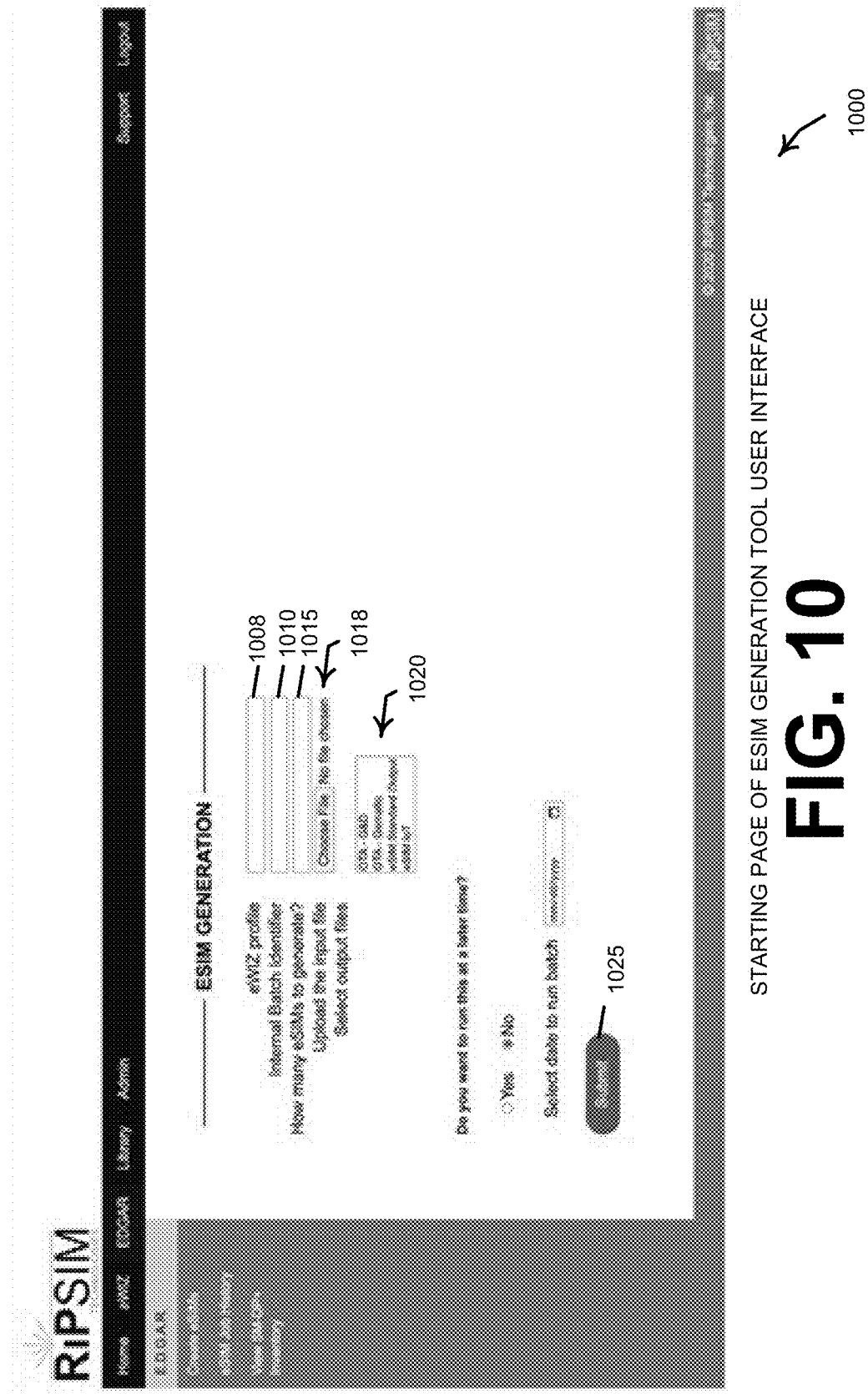
FIG. 10 illustrates an example starting page of the eSIM Generation Tool User Interface.

Another novel feature of the eSIM Generation Tool is its capability to automate eSIM generation. FIG. 10 illustrates a starting page for the eSIM Generation Tool User Interface. As shown in FIG. 10, a user is prompted via an interface to select an eSIM Profile Template (also known as an eWIZ Profile Template in RiPSIM parlance), a WSP Input Data file, and a specific quantity of eSIM profiles to produce. With a click of a button at the eSIM Generation Tool User Interface, the eSIM Generation Tool retrieves a WSP Input Data file that corresponds to data provided, or entered, via the eSIM Generation Tool User Interface and automatically determines the type of data to extract and further process according to WSP requirements that may have been specified when a user created or modified the selected eSIM profile template. In parallel, the eSIM Generation Tool aggregates eSIM Output Data in a format specified via the administrative user interface which are intended for storage in, or use by, the WSP's backend systems such as HLR/ HSS/UDM, SIM OTA, SM-DP+/SM-DP/SM-SR or OSS/ BSS. This is a much more streamlined process of eSIM generation than exists in market today because the eSIM Generation Tool generates the output data and stores it in real time (typically within seconds or less of generation) to one of the backend system components without the output data ever having to traverse the edge of the WSP's secure private network from a SIM vendor internet transmission or without the output data having to be physically loaded from a device such as a flash drive received from a SIM vendor.

Turning now to FIG. 1, the figure illustrates an eSIM creation, generation, and management system 20 for creating a Subscriber Identity profile ("eSIM") with an administrative user system 12 and for delivering the eSIM profile to an end user device 14 via a WSP secure private network 18. The administrative user system 12 may include a user interface running on a user data entry computer device coupled to, or within, the secure private network 18. Administrative user system 12 may also be referred to as an onboarding data entry system for use by personnel authorized by a WSP to create one or more eSIM profile templates using the administrative user system 12. A Subscriber Identity/eSIM profile is software that includes information storable in a computer memory. A Subscriber Identity/eSIM profile may include information that has been typically stored in a conventional Subscriber Identity Module ("SIM") Card that is removable hardware installed in a user equipment device ("UE") that can communicate over a long-range wireless communication network such as a cellular phone network, a 2G network, at 3G network a 4G network, a 5G network, and the like. Such long-range wireless networks such as secure network 18, typically include a Radio Access Network ("RAN") 19 for facilitating wireless connectivity to UE devices, such as device 14. Secure network also comprises WSP's wireless infrastructure cloud 16. It will be appreciated that eSIM creation, generation, and management system 20, secure private network 18, IT infrastructure cloud 16, may all be part of an overall communication system 10 that is controlled and operated by a single entity WSP. It will also be appreciated that although a broken line that represents eSIM creation, generation, and management system 20 in FIG. 1 is shown partially outside of IT infrastructure cloud 16, the eSIM creation, generation, and management system 20 may be completely operated and implemented using components that are logically within the IT infrastructure. Examples of UE devices, for example device 14, may include, but are not limited to, smart phones, tablets, lap top computers, and myriad machine-to-machine wireless devices that collect or communicate information to other devices in communication with secure private network 18. A typical UE includes certain information that is unique to the UE and that is used to authenticate the UE with one or more components of secure network 18. The information that is unique to the UE may include encryption keys that are unique to device 14. The unique information included in, and stored within, device 14 also may include a phone number, an IMEI, and an IMSI. The unique information included in, and stored within, device 14 also may include contact information stored within the UE by a user thereof. The unique information included in, and stored within, device 14 also may include information used by secure network 18 for facilitating wireless communication between device 14 and components of secure network 18 to manage radio connectivity between the secure network 18 and device 14. The unique information stored within device 14, non-exhaustive examples of which are described above, may be referred to as a profile, or as information that composes, or makes up, part of, or all of, a profile. Such a profile may be referred to as an electronic SIM profile ("eSIM"). Such profile information may be stored on a UICC (i.e., a SIM Card) or an eUICC (i.e., an embedded SIM Card), which may be essentially a SIM Card that has been permanently connected (e.g., soldered) to a circuit board of a UE device. An eSIM profile, as disclosed herein, may also be stored within a memory of a device 14, such as a memory of a processor of the device (i.e., an iUICC or integrated SIM Card) that is dedicated to storing eSIM profile information, data, algorithms, applications, or authentication information, instead of on a discrete SIM Card/UICC that has been installed in a wireless device.

Such eSIM profile information may be generated within WSP's IT Infrastructure Cloud 16 from information entered via a user interface running on a computer device of administrative interface 12 such that a third party using a device that is not a part of, or within, network 18 (i.e., no network access to anything outside of network 18), is not used to create profile information that is ultimately stored to device 14.

eSIM creation, generation, and management system 20, which may be referred to as a self-contained eSIM generation system (i.e., contained within WSP's IT Infrastructure Cloud 16) receives information from the administrative user system 12. eSIM creation, generation, and management system 20 transmits and receives information and data to and from one or more computer components (hardware or software) of a WSP's Information Technology ("IT") infrastructure backend system 22. IT infrastructure backend 22 may include computer components, including hardware or software, that are part of, coupled to, and are not accessible from any component or network that is not part of, or that does not have permission to access, the WSP's private network 18.

In addition to components, including hardware or software, that comprise eSIM creation, generation, and management system 20, FIG. 1 also illustrates high-level steps of a method that may be executed by multiple hardware components of the eSIM creation, generation, and management system that facilitate creation and delivery of eSIM profile information to an end-user wireless device without information being sent between a WSP's private network 18 and a third-party network or computer device that is not part of the WSP's private network.

At step 1, an authorized user 24 uses an administrative user interface 26 to enter onboarding data that may be used to create an eSIM profile template. Administrative user interface 26 may include a software-based application such as a browser, or a custom data screen. User interface 26 may include a hardware component, such as an alphanumeric display, for example an LCD readout module. At step 1 user 24, using a software browser administrative user interface application, for example, may select, or enter, information including data for a specific eSIM Profile Template.

After user 24 enters information via the administrative user interface 26, the interface, or a computer device upon which the interface is running, transmits an eSIM profile template that the administrative user interface 26 determines, or that a computer on which the interface is running or hosted by determines. The determination may be made based on data entries provided by user 24 via administrative user interface 26. At step 2, the administrative user interface 26, or a computer device upon which the interface is running, transmits a determined eSIM profile template, or an identifier of an eSIM profile template, to an eSIM Generation Tool 40 provided by the self-contained eSIM creation, generation, and management system 20. At step 3, the requisite WSP Input Data file is selected by the eSIM eSIM Generation Tool 40. At step 4, the eSIM Generation Tool 40 may process information received in steps 2 and 3, including deriving information based on information received at step 2, and may forward some of the information to the WSP IT infrastructure system 22 at step 5. At step 6, the WSP IT Infrastructure 22 receives and stores the eSIM provisioning data and responds to the eSIM creation, generation, and management system 20 with an acknowledgement for successful provisioning or an error code for failed provisioning. Also at step 4, the eSIM Generation Tool 40 may generate an eSIM profile and forward said eSIM profile to one or more components of the network 18 at step 7, which forwards the eSIM profile on to the user device 14 at step 8 via RAN 19.

An eSIM profile template may refer to a specific collection of information types, data types, or network parameters that corresponds to a particular type of user device 14. For example, in FIG. 1, the image of device 14 is represented by a symbol for a smartphone. An eSIM profile template for a smartphone may include fields for storing data or information, algorithms, applications, and authentication information that is used by a smartphone for facilitating various functionality that a smartphone typically provides and performs. For example, an eSIM profile for a smartphone to be used by a consumer may include certain information, data, algorithms, applications, or authentication information that includes a publicly accessible (callable) phone number. An eSIM profile for a wireless consumer device such as a smartwatch may include certain information, data, algorithms, applications, or authentication information that includes a publicly accessible (callable) phone number that correspond to such a device and may differ from the eSIM profile discussed above that corresponds to the smartphone. An eSIM profile for a wireless machine-to-machine device that does not typically operate with human involvement may include certain information, data, algorithms, applications, or authentication information that may have some overlap with eSIM profiles for smartphone or smartwatches but that may differ from the information, data, algorithms, applications, or authentication information for the eSIM profiles for smartphones, smartwatches, or other consumer operated devices. eSIM information, data, algorithms, applications, or authentication information that is specific to a particular type of device may be specified by the WSP. Thus, an eSIM profile template may be determined based on data entry to the administrative user interface 26 and may differ from one device to the next being provisioned to WSP private network 18.

Figure 2:
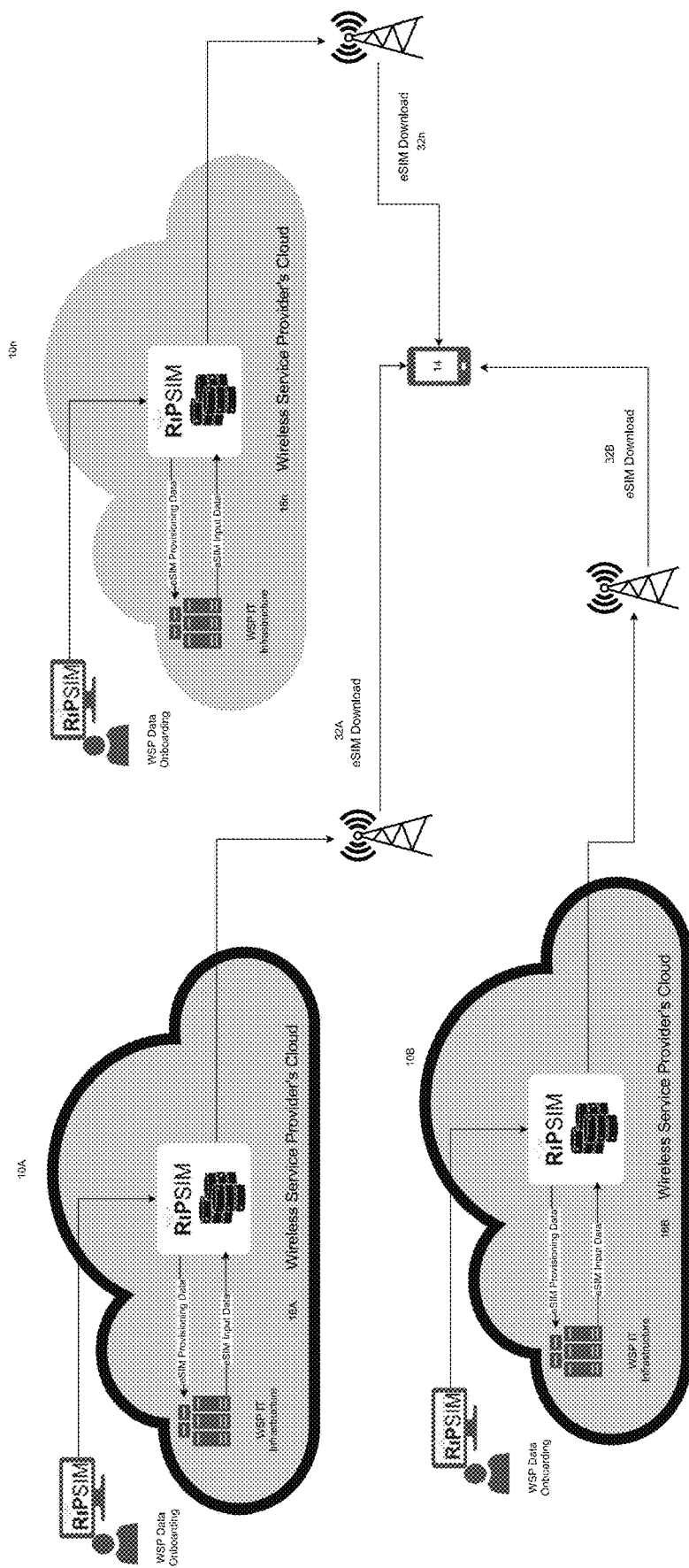
FIG. 2 illustrates multiple systems that each design and generate an eSIM profile within a corresponding WSP private network without sharing of information with an entity that is outside of the private network, and for delivering each of the respective WSPs eSIM profiles to a wireless user device for use by the device in accessing the corresponding WSP's private networks and services therefrom.

Turning now to FIG. 2, the figure illustrates a scenario where multiple WSPs systems 10A, 10B, . . . 10n each use similar components as shown in FIG. 1 to create eSIM profiles that only can be used to authenticate to their respective private networks, using information stored in eSIM profiles 32A, 32B, . . . 32n, respectively.

WSP Onboarding Data

An eSIM profile may be selected based on information entered by a user using an administrative user system 12. Information that may be entered via system 12 may include information that corresponds to parameters shown below in Table 1. Table 1 shows information that may be received via administrative user system 12 and shows corresponding parameter fields of an eSIM profile into which the information provided via the administrative user system may be inserted.

TABLE 1

| Data Collected Via Onboarding Wizard/ Administrative user interface | | eSIM Profile Elements That Store Corresponding Onboarding Data |
|---|---|---|
| Network Authentication | Milenage TUAK 3G TEST | PE-AKAParameter |
| 5G SUCI Encryption Scheme | Based on ME Based on USIM | PE-DF-5GS PE-DF-SAIP |
| ISIM Configuration | Domain Name IMPI IMPU P-CSCF GBA | PE-ISIM PE-OPT-ISIM |
| RFM Configuration | | PE-RFM |
| RAM Configuration | | PE-SecurityDomain |
| Admin Agent | | PE-SecurityDomain |
| OTA Keys | | PE-SecurityDomain |
| PIN | | PE-PINcodes |
| PUK | | PE-PUKcodes |
| Java Applets | | PE-Application |
| Proprietary Files | | PE-GenericFileManagement |
| M2M Connectivity Parameters | | ProfileHeader |
| Network Name | | PE-OPT-USIM |
| Home PLMN w/Access Technology | | PE-OPT-USIM |
| Operator-controlled PLMN w/Access Technology | | PE-OPT-USIM |
| Equivalent Home PLMN | | PE-OPT-USIM |
| Last Registered PLMN | | PE-OPT-USIM |
| Higher Priority PLMN Search Period | | PE-USIM |
| SMS Parameters | | PE-USIM/PE-ISIM |
| GID1/GID2 | | PE-OPT-USIM |
| Emergency Call Codes | | PE-USIM |
| Regulatory eCall Support | | PE-USIM/PE-OPT-USIM |
| Language | | PE-MF/PE-OPT-USIM |
| USIM Service Table | | PE-USIM |
| ISIM Service Table | | PE-ISIM |

Onboarding data shown in Table 1 may contain information that is unique to a given WSP and that WSP's network deployment. For example, network authentication data is considered essential and unique to establish a trusted communication path, or link, between an eSIM and the core network. Role-based access allows authorized WSP personnel to securely enter network authentication data for use by eSIM creation, generation, and management system 20 via a browser-based application administrative user interface 26. Subsequently, software running on a computer device of administrative system 12 may use Onboarding data that was entered by a user authorized by a given WSP to generate authentication keying material according to one or more parameters specified by a given eSIM profile template. The Onboarding data listed in Table 1 is not exhaustive of all parameter data that an eSIM profile template may include. Table 4 shows an even more comprehensive list of Profile Elements that a complete eSIM profile template, or an eSIM profile generated based thereon, may comprise.

Input Data from WSP

A given WSP typically uses a unique format for Input Data, or an Input Data file ("input file") and its contents vary as compared to another WSP. WSPs may manage the range of ICCID and/or IMSI based on stock-keeping unit ("SKU") values of a given wireless user device, network features that it may provide or is configured to provide, or specific provisioning purposes that may apply for a given wireless user device. Generally, an Input Data file contains Input Data that includes unique identifiers of an eSIM such as ICCID and IMSI. During eSIM generation, unique provisioning information and data is generated and associated with ICCID/IMSI and stored according to an eSIM profile template that was selected based on information that was entered by a user of administrative system 12 administrative user interface 26 at step 1 shown in FIG. 1. Tables 2 and 3 provide two examples of a typical WSP Input Data file and information that is extracted therefrom for further processing.

into a WSP's IT infrastructure backend system to push, or transmit, provisioning data to each eSIM at the time of activation of said eSIM (i.e., a user of a wireless user device corresponding to the given eSIM has subscribed to receive services from the WSP and the WSP 'activates' the eSIM so that the user's corresponding wireless user device can receive wireless services, or other services, from the WSP when the wireless user device authenticates itself with components of private network 18) as well as to perform maintenance on the eSIMs over the air. An SM-DP+ or SM-DP/SM-SR is a subscription management element and its primary role is to securely store and deliver eSIMs to wireless user devices in the field over the air. The following

TABLE 2

| Original Input Data File from WSP (example #1) | Extracted Data |
|---|---|
| <header> | Batch #: 00000101 => To display in E.D.G.A.R. |
| Date: 08/14/2021 | SKU: M2M-012-a1 => To store and use it against the |
| PO #: 000012 | eSIM generation policy |
| Batch #: 00000101 | AlgoID: 01 => To choose the right network |
| SKU: M2M-012-a1 | authentication set entered in Onboarding Wizard |
| AlgoID: 01 | Start ICCID: 8913560000012345678 => ICCID is |
| .        => may include extraneous contents | 19 or 20 bytes long. The last digit is called Luhn digit |
| . | and it can be derived with the first 18 or 19 digits. |
| </header> | Start IMSI: 310356001234567 |
| <input data> | Quantity: 50,000 => increment ICCID and IMSI by |
| Start ICCID: 8913560000012345678 | one until it reaches the indicated quantity |
| Start IMSI: 310356001234567 | |
| Quantity: 50,000 | |
| </input data> | |

TABLE 3

| Original Input Data File from WSP (example #2) | Extracted Data |
|---|---|
| <header> | Batch #: 00000101 => To display in E.D.G.A.R. |
| Date: 08/14/2021 | SKU: M2M-012-a1 => To store and use it against the |
| PO #: 000012 | eSIM generation policy |
| Batch #: 00000101 | AlgoID: 01 => To choose the right network |
| SKU: M2M-012-a1 | authentication set entered in Onboarding Wizard |
| AlgoID: 01 | 8913560000123456784 310356001234567 |
| .        => may include extraneous contents | 8913560000123456792 310356001234568 |
| . | . |
| </header> | . |
| <input data> | . |
| ICCID IMSI | 8913560000123956775 310356001284566 => |
| 8913560000123456784 | Some WSPs specify the ICCID and IMSI pairs. |
| 310356001234567 | |
| 8913560000123456792 | |
| 310356001234568 | |
| . | |
| . | |
| . | |
| 8913560000123956775 | |
| 310356001284566 | |
| </input data> | | eSIM Provisioning

For an eSIM to operate in a WSP's network, its credentials are loaded and provisioned in WSP's backend systems, such as WSP IT Infrastructure backend system 22, which is shown as part of IT infrastructure cloud 16 in FIG. 1. An WSP IT Infrastructure backend system may include OSS/BSS components interfacing to the HLR/HSS/UDM that are part of the core network of secure private network 18. An HLR/HSS/UDM is/are typically responsible for identifying and authenticating a given eSIM prior to authorizing network resources to a wireless user device that corresponds to the given eSIM. A SIM-OTA server is an element integrated backend systems/components may use certain eSIM information and data, listed following the component name below, that include, but are not limited to:

HLR/HSS/UDM, OSS/BSS: ICCID, IMSI, K (key), PIN, PUK, ADM, ACC, IMPI, IMPU

SIM-OTA: ICCID, IMSI, OTA Keys—SCP80 (KiC, KID, DEK), SCP81 (PSK, DEK)

SM-DP+ or SM-DP/SM-SR: ICCID, eSIM (in .DER), activation code (applicable to SM-DP+)

eSIM that is Downloaded

In an aspect, software running at administrative system 12 or part of eSIM creation, generation, and management system 20 shown in FIG. 1 constructs an eSIM profile based on an industry specification from Trusted Connectivity Alliance ("TCA"). The specification is referred to as "eUICC Profile Package: Interoperable Format Technical Specification". Table 4 shows an example of Profile Element ("PE") parameter/types and information/data contents of an eSIM profile . . . not all PEs are required for building of an eSIM profile. In an aspect, software, that may run on administrative system 12 or as part of self-contained eSIM creation, generation, and management system 20 builds an eSIM profile template (which may be thought of as a data record analogous to a stencil that directs the creation of one or more eSIM profiles that include information and data according to parameters and parameter attributes of one or more data fields in the template much like a stencil facilitates creating a pattern by directing paint to a surface according to areas of the stencil that have been excised from a material from which the stencil is created) based on data that user 24 enters using administrative user interface 26 that is running on administrative user system 12. Said software then creates provisionable eSIMs by a) generating eSIM data based on onboarding data as well as WSP Input Data retrieved directly from an Input Data server of the WSP and b) marrying said eSIM data with an eSIM profile template (i.e., populating fields of an eSIM profile template with the generated eSIM data). The final format of an eSIM is typically provided per a standard specification, such as a TCA specification, and, once downloaded to a device via SM-DP+/SM-DP/SM-SR, the eSIM profile is installed in the physical eUICC or iUICC (or future hardware security element) in the end device, such as a smartphone device or a machine-to-machine wireless device. At that point, the eSIM profile becomes the unique subscriber identity profile that allows a WSP customer's wireless device onto, and to access. the WSP's network for connectivity service.

TABLE 4

| Profile Element Type | Profile Element Content |
| --- | --- |
| ProfileHeader | major-version |
| | minor-version |
| | profileType |
| | iccid |
| | pol |
| | eUICC-Mandatory-services |
| | eUICC-Mandatory-GFSTEList |
| | connectivityParameters |
| | eUICC-Mandatory-AIDs |
| PE-MF | mf-header |
| | templateID |
| | mf |
| | ef-pl |
| | ef-iccid |
| | ef-dir |
| | ef-arr |
| | ef-umpc |
| PE-CD | cd-header |
| | templateID |
| | df-cd |
| | ef-launchpad |
| | ef-icon |
| PE-TELECOM | telecom-header |
| | templateID |
| | df-telecom |
| | ef-arr |
| | ef-rma |
| | ef-sume |
| | ef-ice-dn |
| | ef-ice-ff |
| | ef-psismsc |
| | df-graphics |
| | ef-img |

TABLE 4-continued

| Profile Element Type | Profile Element Content |
| --- | --- |
| | ef-iidf |
| | ef-ice-graphics |
| | ef-launch-scws |
| | ef-icon |
| | df-phonebook |
| | ef-pbr |
| | ef-ext1 |
| | ef-aas |
| | ef-gas |
| | ef-psc |
| | ef-cc |
| | ef-puid |
| | ef-iap |
| | ef-adn |
| | ef-pbc |
| | ef-anr |
| | ef-puri |
| | ef-email |
| | ef-sne |
| | ef-uid |
| | ef-grp |
| | ef-ccp1 |
| | df-multimedia |
| | ef-mml |
| | ef-mmdf |
| | df-mmss |
| | ef-mlpl |
| | ef-mspl |
| | ef-mmssmode |
| PE-USIM | usim-header |
| | templateID |
| | adf-usim |
| | ef-imsi |
| | ef-arr |
| | ef-keys |
| | ef-keysPS |
| | ef-hpplmn |
| | ef-ust |
| | ef-fdn |
| | ef-sms |
| | ef-smsp |
| | ef-smss |
| | ef-spn |
| | ef-est |
| | ef-start-hfn |
| | ef-threshold |
| | ef-psloci |
| | ef-acc |
| | ef-fplmn |
| | ef-loci |
| | ef-ad |
| | ef-ecc |
| | ef-netpar |
| | ef-epsloci |
| | ef-epsnsc |
| PE-OPT-USIM | optusim-header |
| | templateID |
| | ef-li |
| | ef-acmax |
| | ef-acm |
| | ef-gid1 |
| | ef-gid2 |
| | ef-msisdn |
| | ef-puct |
| | ef-cbmi |
| | ef-cbmid |
| | ef-sdn |
| | ef-ext2 |
| | ef-ext3 |
| | ef-cbmir |
| | ef-plmnwact |
| | ef-oplmnwact |
| | ef-hplmnwact |
| | ef-dck |
| | ef-cnl |
| | ef-smsr |
| | ef-bdn |
| | ef-ext5 |

TABLE 4-continued

| Profile Element Type | Profile Element Content |
|---|---|
| | ef-ccp2 |
| | ef-ext4 |
| | ef-acl |
| | ef-cmi |
| | ef-ici |
| | ef-oci |
| | ef-ict |
| | ef-oct |
| | ef-vgcs |
| | ef-vgcss |
| | ef-vbs |
| | ef-vbss |
| | ef-emlpp |
| | ef-aaem |
| | ef-hiddenkey |
| | ef-pnn |
| | ef-opl |
| | ef-mbdn |
| | ef-ext6 |
| | ef-mbi |
| | ef-mwis |
| | ef-cfis |
| | ef-ext7 |
| | ef-spdi |
| | ef-mmsn |
| | ef-ext8 |
| | ef-mmsicp |
| | ef-mmsup |
| | ef-mmsucp |
| | ef-nia |
| | ef-vgcsca |
| | ef-vbsca |
| | ef-gbabp |
| | ef-msk |
| | ef-muk |
| | ef-ehplmn |
| | ef-gbanl |
| | ef-ehplmnpi |
| | ef-lrplmnsi |
| | ef-nafkca |
| | ef-spni |
| | ef-pnni |
| | ef-ncp-ip |
| | ef-ufc |
| | ef-nasconfig |
| | ef-uicciari |
| | ef-pws |
| | ef-fdnuri |
| | ef-bdnuri |
| | ef-sdnuri |
| | ef-iwl |
| | ef-ips |
| | ef-ipd |
| PE-PHONEBOOK | phonebook-header |
| | templateID |
| | df-phonebook |
| | ef-pbr |
| | ef-ext1 |
| | ef-aas |
| | ef-gas |
| | ef-psc |
| | ef-cc |
| | ef-puid |
| | ef-iap |
| | ef-adn |
| | ef-pbc |
| | ef-anr |
| | ef-puri |
| | ef-email |
| | ef-sne |
| | ef-uid |
| | ef-grp |
| | ef-ccp1 |
| PE-GSM-ACCESS | gsm-access-header |
| | templateID |
| | df-gsm-access |
| | ef-kc |
| | ef-kcgprs |
| | ef-cpbcch |
| | ef-invscan |
| PE-DF-5GS | df-5gs-header |
| | templateID |
| | df-5gs |
| | ef-5gs3gpploci |
| | ef-5gsn3gpploci |
| | ef-5gs3gppnsc |
| | ef-5gsn3gppnsc |
| | ef-5gauthkeys |
| | ef-uac-aic |
| | ef-suci-calc-info |
| | ef-opl5g |
| | ef-nsi |
| | ef-routing-indicator |
| PE-DF-SAIP | df-saip-header |
| | templateID |
| | df-saip |
| | ef-suci-calc-info-usim |
| PE-ISIM | isim-header |
| | templateID |
| | adf-isim |
| | ef-impi |
| | ef-impu |
| | ef-domain |
| | ef-ist |
| | ef-ad |
| | ef-arr |
| PE-OPT-ISIM | optisim-header |
| | templateID |
| | ef-pcscf |
| | ef-sms |
| | ef-smsp |
| | ef-smss |
| | ef-smsr |
| | ef-gbabp |
| | ef-gbanl |
| | ef-nafkca |
| | ef-uicciari |
| PE-EAP | eap-header |
| | templateID |
| | df-eap |
| | ef-eapkeys |
| | ef-eapstatus |
| | ef-puid |
| | ef-ps |
| | ef-curid |
| | ef-reid |
| | ef-realm |
| PE-GenericFileManagement | gfm-header |
| | fileManagementCMD |
| PE-AKAParameter | aka-header |
| | algoConfiguration |
| | sqnOptions |
| | sqnDelta |
| | sqnAgeLimit |
| | sqnInit |
| PE-PINCodes | pin-Header |
| | pinCodes |
| PE-PUKCodes | puk-Header |
| | pukCodes |
| PE-SecurityDomain | sd-Header |
| | instance |
| | keyList |
| | sdPersoData |
| | openPersoData |
| | catTpParameters |
| PE-Application | app-Header |
| | loadBlock |
| | instanceList |
| PE-RFM | rfm-header |
| | instanceAID |
| | securityDomainAID |
| | tarList |
| | minimumSecurityLevel |
| | uiccAccessDomain |
| | uiccAdminAccessDomain |
| | adfRFMAccess |

TABLE 4-continued

| Profile Element Type | Profile Element Content |
|---|---|
| PE-NonStandard | nonStandard-header |
| | issuerID |
| | content |
| PE-End | end-header |

Turning now to FIG. 3, the figure illustrates components of an eSIM creation, generation, and management system 20 that are part of a WSP's IT Infrastructure Cloud 16, which is part of WSP private network 18, and that are not accessible from devices, system components, or networks that are not part of or are not authorized to be part of or access any part or component of the WSP private communication network. FIG. 3 shows components that are identified by reference numbers. FIG. 3 also identifies nodes 101-114 that are used as points of reference for discussing various components, and their respective functionality, shown in the figure. Components shown in FIG. 3 are described below generally sequentially in reference to describing steps in which their functionalities are implemented. However, it will be appreciated that the numbering of nodes 101-114 does not necessarily correspond to a temporal order in which data flows and in which steps of a method may be performed relative to the components shown in FIG. 3.

At node 101 a user 24 enters information or data into an administrative user interface 26 as shown in FIG. 1, for example a browser application providing access to a web portal as developed by RiPSIM. User 24 is typically an authorized employee of the WSP that operates private network 18 who has been granted access to the web portal.

The administrative user interface 26 may include a browser-based eSIM Profile Creation Tool UI 34, such as, for example, eWIZ UI as developed by RiPSIM, for creating or modifying eSIM profile templates. The administrative user interface 26, may also include an eSIM Generation Tool User Interface 36, such as, for example, E.D.G.A.R. UI as developed by RiPSIM.

When onboarding a WSP (i.e., the process of gathering the WSP data needed to design one or more eSIM profile template(s)), user 24 (i.e., an employee(s) designated by the operator of private network 18) may be guided through a data entry section of the eSIM Profile Creation Tool User Interface 34 to provide/enter information (e.g., network authentication parameters for Milenage and TUAK authentication algorithms, the 5G Home Network Public Key, and Master Keys (a generic term to denote any master key used as a seed for key derivation), ISIM configuration, PIN & PUK, and Java applets). When using the administrative user interface 26, the user 24 may select eSIM Profile Creation Tool UI 34 to create or modify an eSIM profile template. It will be appreciated that the term 'onboarding' may refer to the process of using information of the WSP secure private network to generate one or more eSIM profile templates, for use by one or more wireless user devices to authenticate to the private network and to receive services therefrom. Onboarding is typically performed by a designated user or users, such as user 24, who is typically a person within a WSP organization who is highly trusted and has undergone in-depth background checks.

When user 24 uses the eSIM Generation Tool User Interface 36, he, or she, can begin generating one or more eSIMs by selecting an eSIM profile template, which may have already been created, modified, or selected by eSIM Profile Creation Tool UI 34 and by selecting the WSP Input Data file to be used, as well as specifying a quantity of eSIMs to be generated. The term 'Input Data' or 'Input File Data' are terms used in the art of eSIM profile generation (heretofore profiles have been generated outside of a WSP's secure private network 18) and refer to information or data, namely ICCIDs and IMSIs, that is/are specific to secure private network 18 that an operator thereof uniquely uses for generating of eSIM profiles that may be used to authenticate to, obtain access to, or receive services from, the private network.

At node 102, the eSIM Profile Creation Tool UI 34 forwards information entered thereto, or selected or determined therefrom, to eSIM Profile Template Repository 38, which may be a table, database, or other means for storing digital information. When user 24 creates or modifies eSIM profile templates using eSIM Profile Creation Tool UI 34, the templates get saved in repository 38, which may be a computer memory, such as a disk drive, a solid-state memory, a dynamic memory, a static memory, and the like accessible by components within private network 18 but not accessible from computer devices outside of private network 18. When user 24 accesses eSIM Profile Creation Tool UI 34 to modify eSIM profile templates after creation and storing thereof, the already-created/existing templates are retrieved from repository 38. Templates typically include one or more Profile Elements ("PE") and the eSIM Profile Creation Tool UI 34 can intelligently determine a given PE, or PEs, to add to one or more templates stored in repository 38 based on information or data, such as onboarding information or data entered by user 24 to eSIM Profile Creation Tool UI 34. For example, when user 24 enters any of the data in left-hand column of Table 1 above and corresponding configurations into the eSIM Profile Creation Tool User Interface 34 in the Wizard mode, the eSIM Profile Creation Tool User Interface 34 may automatically add a corresponding PE-Application or information value, shown in the right-hand column of Table 1, to the eSIM profile template. eSIM Profile Creation Tool UI 34 may also determine where, within a PE or PEs, to store/populate onboarding data. eSIM Profile Creation Tool UI 34 may determine a PE, or PEs, to add to a profile template, or templates, in real time as user 24 enters onboarding data or information via eSIM Profile Creation Tool UI 34.

At node 103, the eSIM Profile Creation UI 34 provides the sensitive onboarding data or information to Hardware Security Module ("HSM") 46 via interface 48. Some onboarding data includes sensitive information that a given WSP generally desires to safeguard in a secure data store, such as in HSM 46. A WSP generally ensures the security (i.e., secure from hacking from outside of the WSP's secure private network 18 shown in FIG. 3) of one of its HSMs by restricting access to the HSM from intrusion from a device outside of the private network through physical or logical means. Thus, interface 48 is a component that is specially allowed by a WSP and is not an interface, such as a software port, that is easily accessible from outside of the WSP's private network. An example of sensitive onboarding data is network authentication parameters that include a master key called OP from which individual eSIM keys are derived. Once entered in the eSIM Profile Creation Tool User Interface 34, the interface passes the sensitive onboarding data to HSM interface 48 directly which then provides the data to HSM 46.

Interface 48 provides onboarding data to HSM 46 at node 104 as shown in FIG. 3. In an aspect, interface 48 to HSM 46 is implemented as a form of an Application Programming Interface ("API"). In the aspect, specific calls may be made by eSIM Profile Template Repository 38 toward interface 48 for HSM 46 for the injecting, or providing, sensitive data into HSM 46 during onboarding. In another aspect, other specific API calls may be made by eSIM Generation Tool 40 to initiate cryptographic operations, based on the injected sensitive data, within HSM 46 when the eSIM Generation Tool User Interface 36 initiates, causes, or manages, the generation of eSIM profile data or information.

A typical WSP operates an Input Data server 42 as part of its secure private network 18. Input Data server interface 44 provides an interface between Input Data server 42 and eSIM Generation Tool 40, which is typically part of eSIM creation, generation, and management system 20 and which may comprise software components. eSIM Generation Tool 40 may include hardware components, although preferably the eSIM Generation Tool is one or more software components running on a one or more computer devices that may be physically part of, logically part of, or have authorized communication with, private network 18. eSIM Generation Tool 40 may be thought of as a software engine that is the heart of eSIM creation, generation, and management 20, wherein the engine (may be referred to as a module) runs on a computer device of, is inside of, or is part of a component that is behind a firewall of a WSP's secure private network and that manages providing interfaces to users, receiving onboarding data from the eSIM Profile Creation Tool UI, requesting Input Data from a WSP's Input Data server 42, generating eSIM profiles based on created or modified templates and onboarding data and WSP Input Data, and outputting eSIM profiles to servers of the WSP's private network that then distribute the eSIM profiles to wireless user devices, or wireless machine devices, in the field.

Input Data server 42 is typically part of the WSP's IT infrastructure and it is typically responsible for generating Input Data specific to WSP's requirements. After generating the Input Data, WSP Input Data server 42 submits the Input Data to Input Data server interface 44.

At node 106, data flows from Input Data server interface 44 to eSIM Generation Tool 40. Input Data server interface 44 may be implemented as a proxy and is typically responsible for parsing the original Input Data provided by the WSP, and for extracting specific information from the Input Data required for further processing by eSIM Generation Tool 40. Once extracted from the Input Data server 42 and provided through Input Data server interface 44, the Input Data passes to eSIM Generation Tool 40 where the Input Data may be stored and subsequently used for eSIM data generation. In an aspect, eSIM generation using a given set of Input Data may occur before the storing of the given set of Input Data.

At node 107 data entered by a user of eSIM Generation Tool User Interface 36 is provided to eSIM Generation Tool/module 40. The administrative user interface 26 may also include an eSIM Generation Tool User Interface 36. A user using eSIM Generation Tool User Interface 36 may be the same user 24 who used eSIM Profile Creation Tool UI 34. However, a different user than a user who can access eSIM Profile Creation Tool UI 34 may access eSIM Generation Tool User Interface 36.

The WSP user triggers, or initiates, eSIM generation from the eSIM Generation Tool User Interface 36. Once triggered or initiated, eSIM Generation Tool 40 retrieves certain data from the repository 38 and HSM 46 and generates eSIM profiles and corresponding provisioning/output data. Then, eSIM Generation Tool 40 pushes the eSIM profiles and provisioning/output data to the interfaces indicated at nodes 110 and 111, or eSIM loading interface 52 and output files interface 58, respectively.

At node 108 eSIM Generation Tool 40 retrieves one or more eSIM profile template(s) from Repository 38.

At node 109, when eSIM Generation Tool 40 generates eSIM data, the eSIM Generation Tool 40 makes an API call toward HSM interface 48 by specifying the master key (i.e., the identifier of the WSP private network 18) and providing other information (e.g., diversification factor). At node 104, the HSM interface 48 contacts the HSM 46, which performs cryptographic operations, and retrieves the requisite data.

At node 110 eSIM loading interface 52 may be implemented as an API configured to handle specific calls from and to eSIM Generation Tool 40 as well as to and from WSP SM-DP+/SM-DP/SM-SR module 50. At node 110 eSIM Generation Tool 40 may make an API call toward eSIM loading interface 52 to submit eSIM profiles to WSP SM-DP+/SM-DP/SM-SR 50. eSIM Generation Tool 40 typically receives a response from the WSP SM-DP+/SM-DP/SM-SR module 50 through eSIM loading interface 52.

At node 111 output files interface 58 may be implemented as an API configured to handle specific calls from and to eSIM Generation Tool 40, HLR/HSS/UDM module 54, or SIM-OTA Server 56, as applicable. At node 111, eSIM Generation Tool 40 may make an API call toward output files interface 58 to submit two types of output files—one for HLR/HSS/UDM and another for SIM-OTA. eSIM Generation Tool 40 may receive a response, respectively, from HLR/HSS/UDM module 54 and SIM-OTA Server 56 through the output files interface.

At node 112 eSIM loading interface provides eSIMs generated by eSIM Generation Tool 40 to SM-DP+/SM-DP/SM-SR module 50. In return, SM-DP+/SM-DP/SM-SR module 50 responds with an 'acknowledgement' ("ack") for successful loading, or a 'no acknowledgement' ("nack") for failed loading along with a specific reason code.

At node 113 output files interface 58 submits network-authentication-related data (e.g., K) generated by eSIM Generation Tool 40 to HLR/HSS/UDM module 54. In return, HLR/HSS/UDM module 54 responds with an ack for successful loading or a nack for failed loading with a specific reason code.

At node 114 output files interface 58 provides SIM-OTA data (e.g., OTA keys) generated by eSIM Generation Tool 40 to SIM-OTA Server 56. In return, SIM-OTA Server 56 responds with an ack for successful loading or a nack for failed loading with a specific reason code. It will be appreciated that by including, and interweaving the various applications, components, modules, and interfaces of eSIM creation, generation, and management system 20 into a WSP's private network 18, so that said parts of the eSIM creation, generation, and management system 20 may interact with elements of the WSP's private network, including highly guarded and protected HSM 46 and Input Data files server 42, generation of eSIM profile templates and eSIM profiles themselves can be accomplished without having to perform many of the time-consuming manual steps typically used to generate an eSIM by a third-party eSIM vendor that is not permitted by the WSP to interact with its HSM and Input Data server. Thus, eSIM creation, generation, and management system 20 facilitates a WSP itself in generating its own eSIM profiles for delivery to wireless user devices in the field that then use the delivered eSIM profiles to connect to and access services from the WSP's private network 18.

Returning now to discussion of FIG. 4, the figure includes a block diagram of several components, whether software or hardware, that may be described in reference to one or more other figures described herein. In addition, FIG. 4 includes several steps of a method 400 and integrates symbols representing the method steps with the components shown in the block diagram. The steps of method 400 are referred to as steps 4xx.

eSIM Profile Creation Tool User Interface 34 is shown as including onboarding data 60, eSIM profile definitions 64, and the eSIM profile template repository 38. Data from the eSIM profile template repository 38 of the eSIM Profile Creation Tool UI 34 is transferred at node 108 into the eSIM Generation Tool 40 either during the same session where a user provides data and information via eSIM Profile Creation Tool UI 34, or whether a different user during a different session. In an aspect, a session would necessarily be a different session from another when different users use system 26 because different users would have different log in credentials for accessing eSIM Profile Creation Tool UI 34 versus accessing eSIM Generation Tool User Interface 36 because only one, or very few, individual(s) have authorization to access the eSIM Profile Creation Tool UI 34 as compared to a larger set of individuals who may be permitted to access the eSIM Generation Tool User Interface.

At step 405 of method 400, a user using eSIM Generation Tool User Interface 36 may request generation of one or more eSIM profiles, via an interface such as the browser-based eSIM generation request interface 1000 as shown in FIG. 10. A user of interface 1000 may enter a profile template name into dialog box 1008 to specify an eSIM profile template that may have been created or modified by the same user, or different user, using eSIM Profile Creation Tool UI 34. The user of interface 1000 may enter a job name, number, or identifier to uniquely identify the eSIM profiles that he, or she, is about to cause to be generated. In dialog box 1015, the user of interface 1000 may specify a desired quantity of eSIM profiles that will make up the job he or she is about to cause to be generated. The user of interface 1000 may choose an Input Data file from Input Data file server 42 shown in FIG. 3 with selection item 1018. A user of interface 1000 may specify an output file name for output data to be stored once the eSIM profiles are generated using selection item 1020. If the user of interface 1000 is ready to generate the specified quantity of eSIM profiles, the user hits the 'Submit' button 1025, which may correspond to Request eSIM generation step 405 shown in FIG. 4.

Continuing with discussion of FIG. 4, at step 410 the eSIM Generation Tool 40 evaluates information received from repository 38 at node 108 and generates a corresponding eSIM profile at step 415. At step 420 the eSIM Generation Tool 40 determines whether the predetermined quantity of eSIM profiles specified in dialog box 1015 of interface 1000 has been reached. If No, method 400 returns to step 410.

If the determination at step 420 is Yes, the eSIM Generation Tool 40 provides output data to servers 54 and 56 at nodes 113 and 114 as described in reference to FIG. 3, and provides the eSIM profiles generated at step 415 to server 50 at node 112. It will be appreciated that instead of waiting until all of the predetermined quantity of eSIM profiles has been generated before providing output data to servers 54 and 56, output data for a given eSIM profile may be stored to the servers as each eSIM profile is generated. Typically, server 50, also known as the SM-DP+/SM-DP/SM-SR, distributes the eSIM profiles to corresponding wireless user devices in the field, such as, for example, user device 14 as shown in FIG. 1. It will be appreciated that all of the components shown in FIG. 4, all of the software methods, use of all of the interfaces described in relation thereto, and all of the data entered, stored, retrieved, processed, evaluated, generated, and distributed preferably all occur within a WSP's private network 18 as shown in FIGS. 1, 2, and 3.

Figure 5:
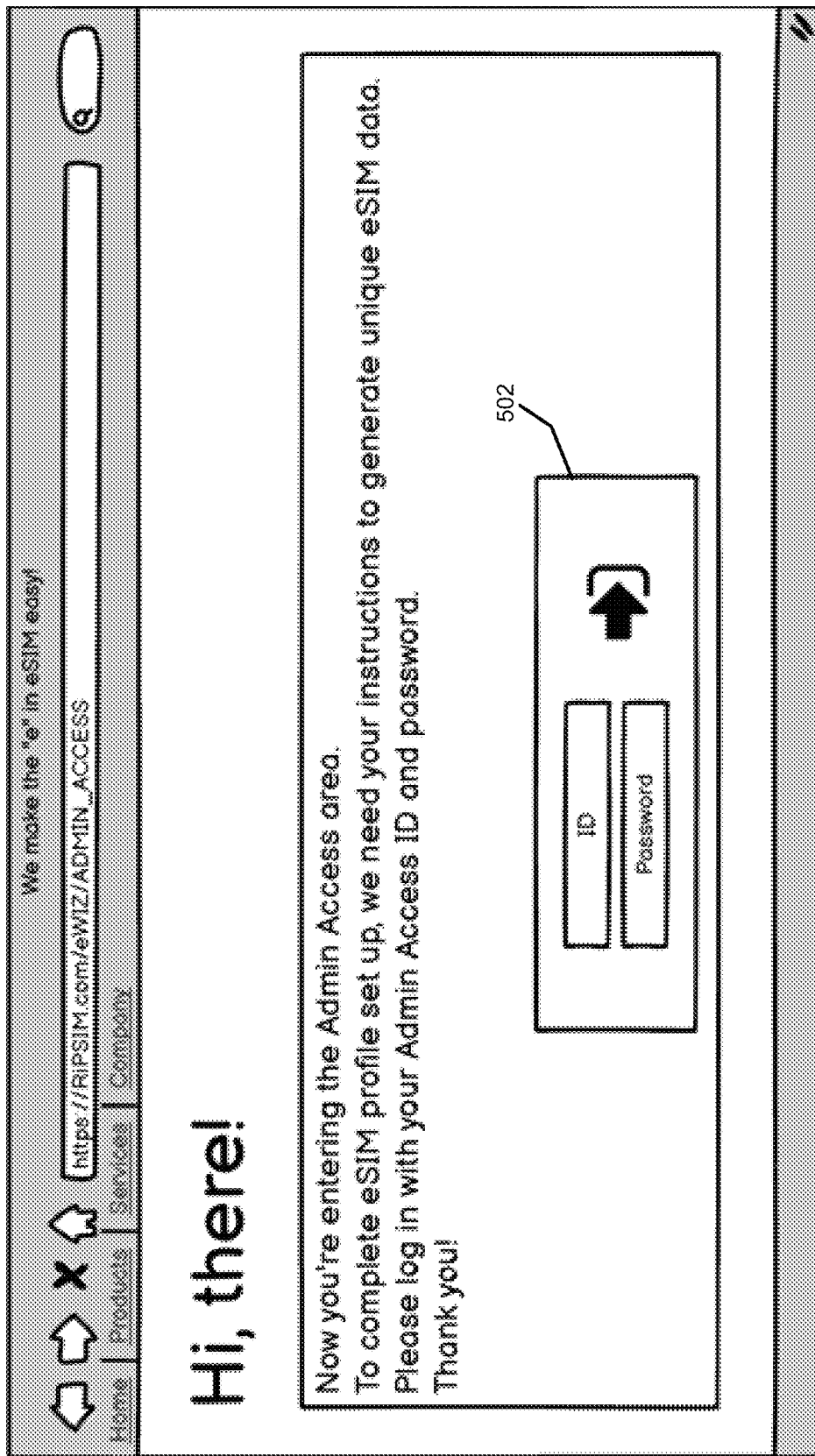
FIG. 5 illustrates an example login page of the administrative user interface.

Turning now to FIG. 5, the figure illustrates a login interface 500 of the administrative user interface 26 of an eSIM Profile Creation Tool UI 34 as described in reference to FIG. 3. A user 24 obtains access to the eSIM profile creation tool user interface 34 by entering login credentials into login credentials entry dialog box 502. Login credentials may include a login name and password. As discussed herein in reference to other figures, a user who can access eSIM profile creation tool user interface 34 is typically a person from a small set (which may be a set of only one individual) of individuals who are highly trusted by a WSP to have access to sensitive and protected data and information, such as network authentication information stored on an HSM. Such a person may be referred to herein as a 'high security' user/employee.

Figure 6:
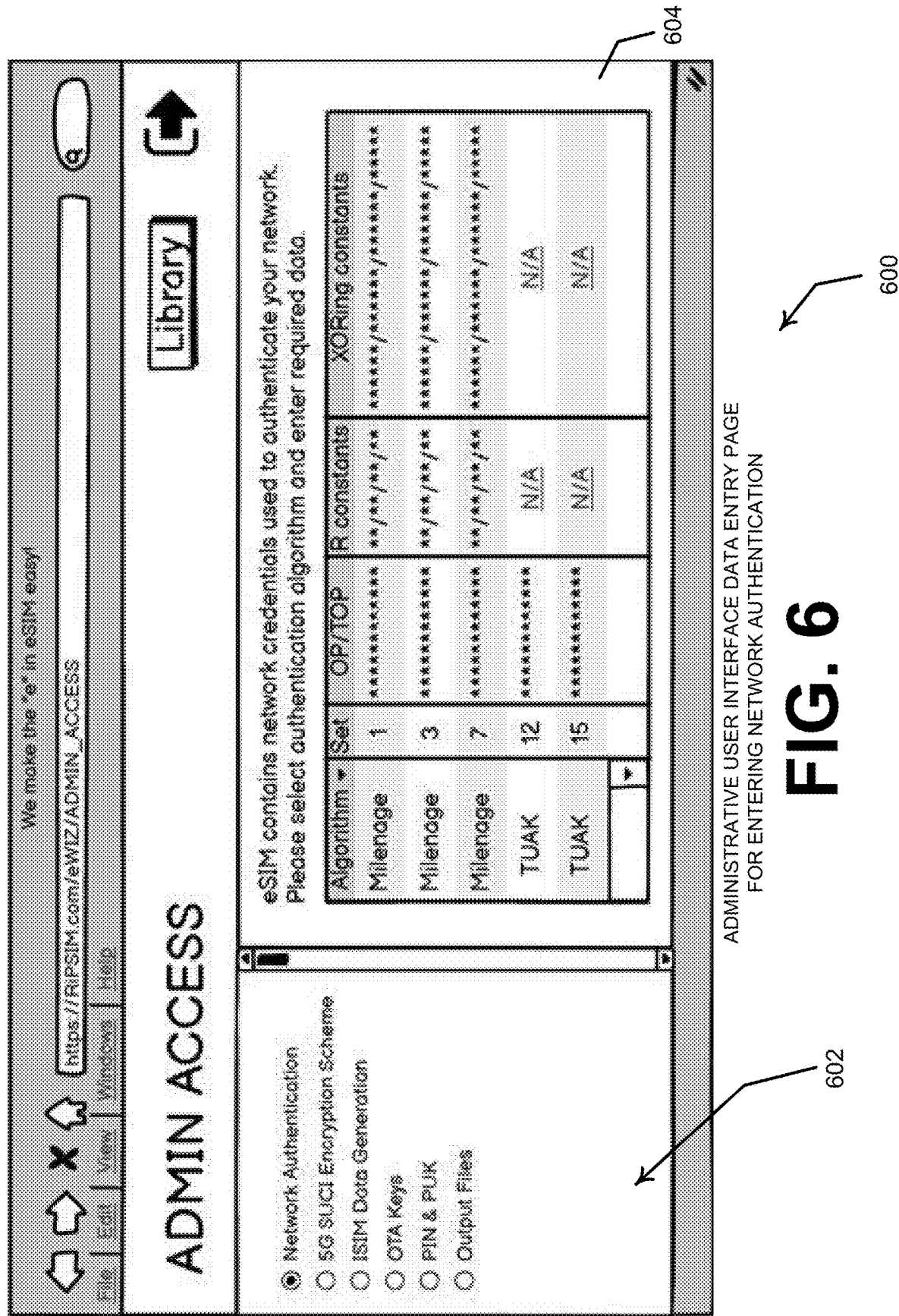
FIG. 6 illustrates an example administrative user interface data entry page for entering network authentication, including selecting authentication algorithms and corresponding values used in the algorithm(s) according to a WSP's private network authentication process configuration.

Turning now to FIG. 6, the figure illustrates an interface 600 of an eSIM Profile Creation Tool UI 34 that allows a high security user who logged in via interface 500 shown in FIG. 5 to select network authentication parameters for creating or modifying an eSIM profile template shown in the navigation pane 602. The high security user may enter values corresponding to the network authentication parameters via data entry pane 604. In the figure, a user has selected the parameter 'Network Authentication' in the navigation pane 602 and then may select which authentication algorithm that an eSIM profile template that he, or she, is creating or modifying will include values for.

Figure 7:
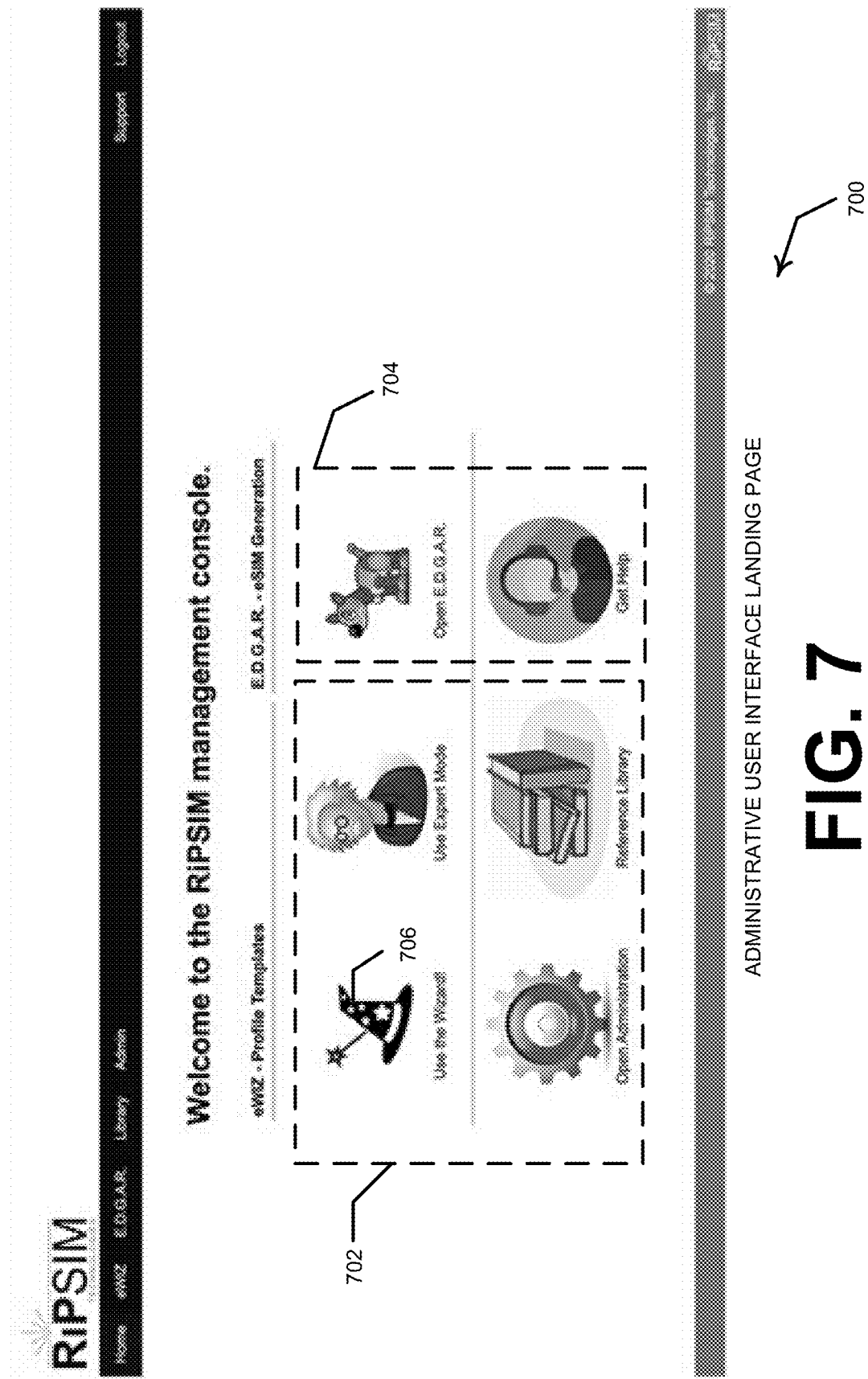
FIG. 7 illustrates an example administrative user interface landing page for selecting various operations, including the creating or modifying of eSIM profile templates.

Turning now to FIG. 7, the figure illustrates a possible welcome page 700 of the administrative user interface 26 of FIG. 1. eSIM profile template icon group 702 includes icons that when clicked lead a user to aspects and features of eSIM Profile Creation Tool UI 34 of FIG. 3. eSIM generation icon group 704 includes icons that when clicked lead a user to aspects and features of eSIM Generation Tool User Interface 36 of FIG. 3.

Figure 8:
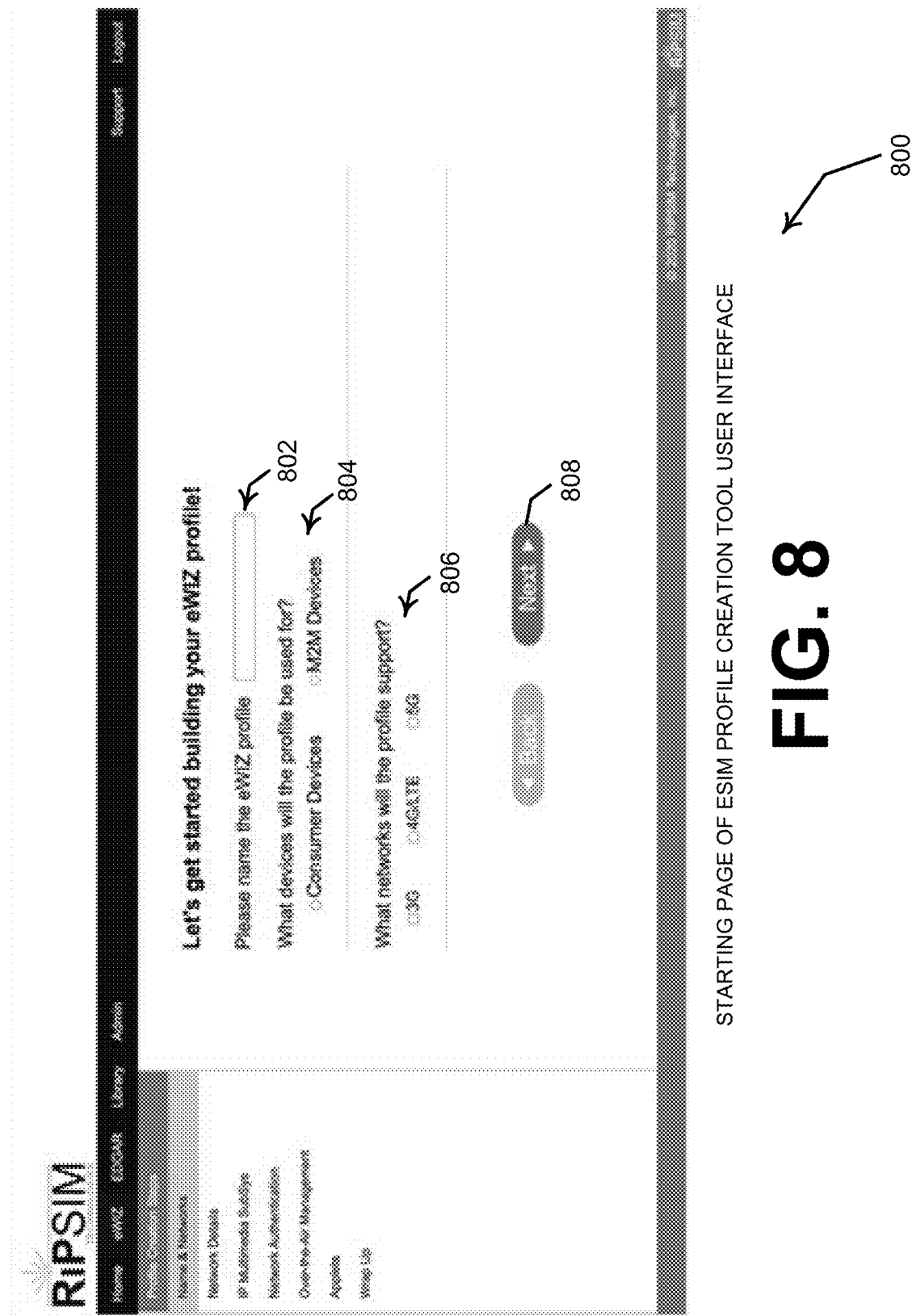
FIG. 8 illustrates an example starting page of the eSIM Profile Creation Tool User Interface.

Turning now to FIG. 8, the figure illustrates a Wizard Mode starting interface screen 800, which may be reached when a user clicks icon 706 of eSIM profile template icon group 702 shown in FIG. 7. Wizard Mode starting screen interface 800 includes a profile template dialog box 802 which a user may use to enter a name of an eSIM profile template to be created or modified by using the Wizard Mode of eSIM Profile Creation Tool UI 34 of FIG. 3. The user may select the type of device for which the eSIM profile template is to be created or modified by selecting a radio button from radio buttons 804 corresponding to a consumer device or an M2M device. As discussed elsewhere herein, the parameters that an eSIM profile may use for a given WSP may differ for a consumer device such as a smart phone versus the parameters used in an eSIM profile for an M2M device. A user may select a type of network for which eSIM profiles generated according to the eSIM profile template being created or modified will be used. As shown in the figure, for example, radio buttons 806 provide a means for selecting between network types 3G, 4G/LTE, or 5G. Depending upon the types of networks that a given WSP may operate or the types of devices that the networks support, the options presented in radio buttons shown in radio buttons 804 and 806 may differ from WSP to WSP. When the user clicks 'Next' button 808, options selected using radio buttons 804 and 806 are associated with the profile template named in profile template dialog box 802, which profile template named therein may be a new template being created during the current user session or may be a template created during a previous session by the user.

Figure 9:
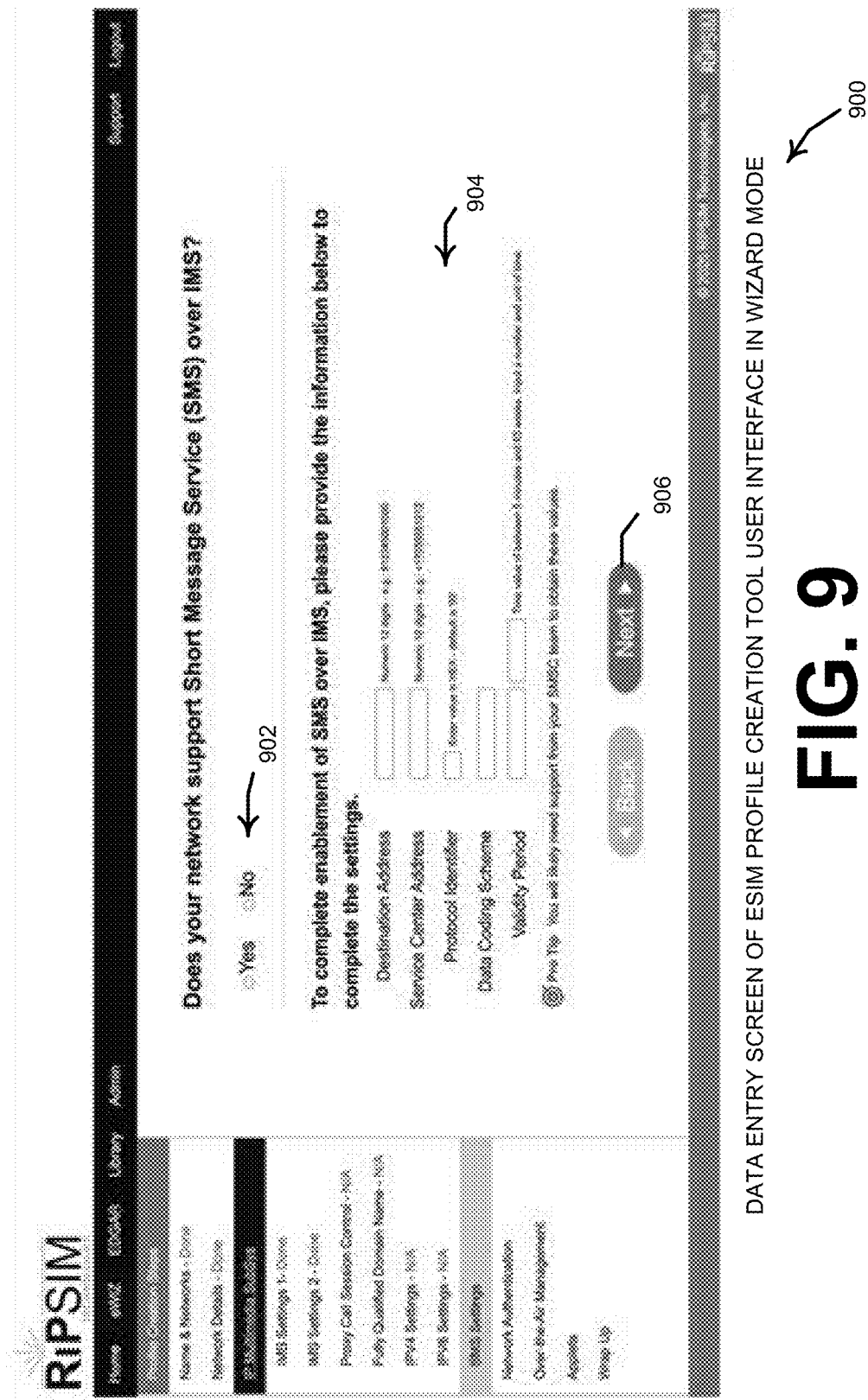
FIG. 9 illustrates an example data entry screen of the eSIM Profile Creation Tool User Interface in Wizard mode to specify whether an eSIM profile template should include SMS over IMS capability.

Another Wizard question/example is shown in FIG. 9, namely the SMS configuration data entry screen interface 900. If the user selects the "No" button of SMS from radio buttons 902 then entry into dialog boxes 904 may not be permitted. If the user selects "Yes" from radio buttons 902, the user is typically presented with dialog boxes 904 that permit the user to enter various values and information that pertain to configuration of an eSIM profile that is generated according to the eSIM profile template being created or modified.

Turning now to FIG. 10, the eSIM generation request interface 1000 was described above in describing FIG. 4. It will be appreciated that a user of eSIM generation request interface 1000 may not necessarily be a high security user; other WSP users may access and use the eSIM generation request interface to cause the creation of one, a few or many test or production eSIM profiles.

Figure 11:
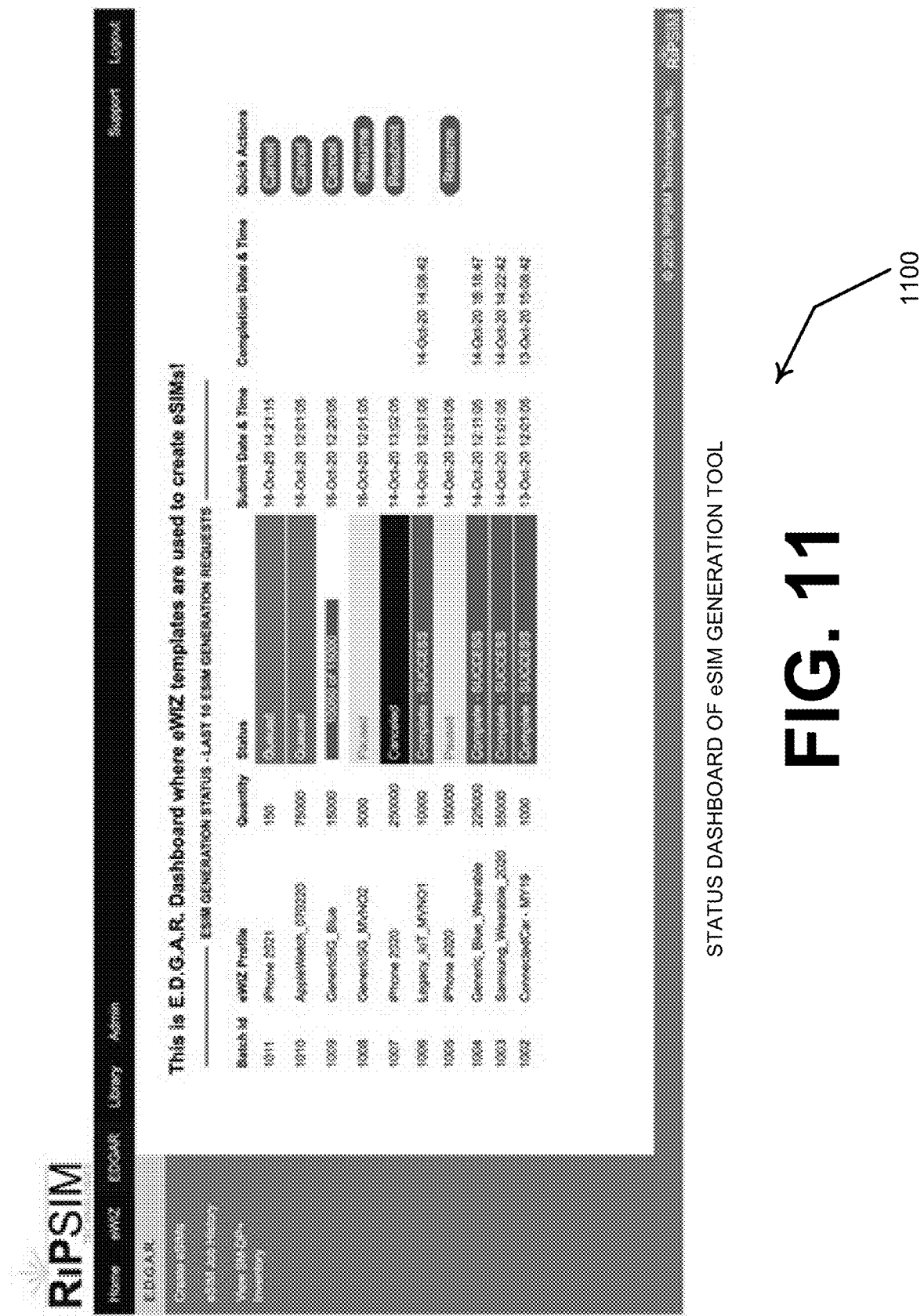
FIG. 11 Illustrates an example status dashboard of the eSIM Generation Tool User Interface.

Turning now to FIG. 11, the figure shows a status dashboard 1100 of eSIM Generation Tool User Interface 36 of FIG. 3. Status dashboard 1100 shows a listing of previously generated eSIM profile jobs that have been generated by the eSIM Generation Tool 40 of the eSIM creation, generation, and management system 20 shown in FIG. 1 that is self-contained within a WSP's private network 18 and that does not involve transporting or transmitting of any onboarding data, eSIM profile templates, output data or eSIMs from or to a third-party vendor or network that is not part of private network 18.

It will be appreciated that although in reference to various user interface screens, descriptions herein make references to embodiments shown in the figures that show examples of various input techniques, such as dialog boxes, dropdown boxes, radio buttons, function-initiating buttons, and the like, such input techniques are shown and described for purposes of discussion and example, but other techniques may be used instead of, or in addition to, the techniques shown in the figures and described herein in reference thereto.

Figure 12:
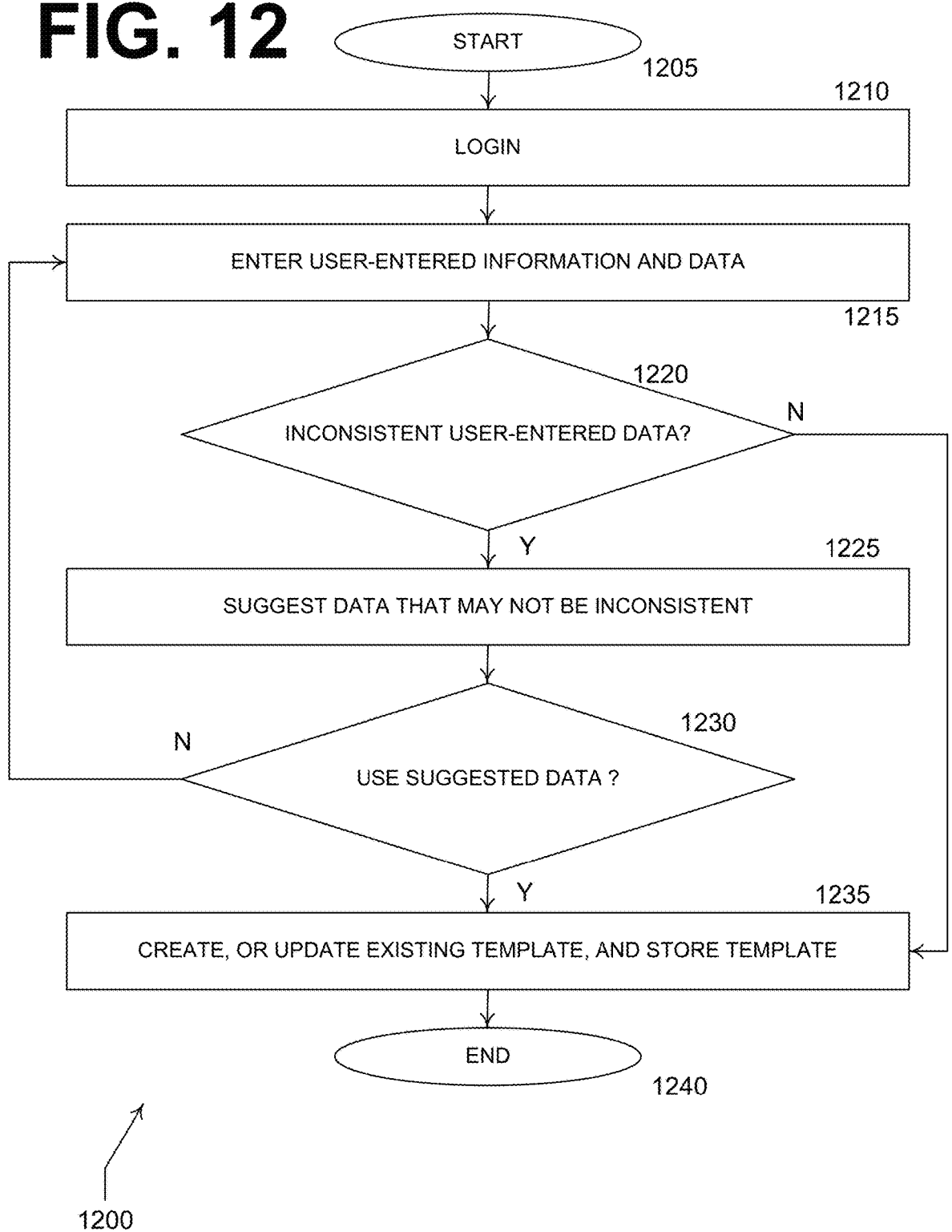
FIG. 12 illustrates a flow diagram of a method for selecting an eSIM profile template for use in creating an eSIM profile using an administrative user interface that is hosted from within a WSP's private network.

Turning now to FIG. 12, the figure illustrates a flow diagram of a method 1200 for creating or modifying an eSIM profile template. Method 1200 starts at step 1205. At step 1210 an authorized user logs in to an administrative user interface, such as interface 500 shown in FIG. 5. At step 1215 the user enters onboarding information and data. For example, the user enters network authentication algorithm information to be used in an eSIM profile that will be generated from the eSIM profile template that is being created in this flow diagram. Other information that a user may enter includes OTA keys, PIN & PUK information, output data file information, and other information, examples of which are shown in the depiction of interface 600 shown in FIG. 6. Other information that a user may enter may include information shown in the interfaces depicted in FIGS. 8 and 9.

At step 1220 user-entered data is compared to already-stored WSP data that corresponds to, or that should correspond to, the user-entered data as well as industry specifications (e.g., the UST or USIM Service Table specification). If an inconsistency or mismatch between entered data and other entered data (which may be referred to as internal inconsistency) or between entered data and industry specification data (which may be referred to as external inconsistency) is detected at step 1220 method 1200 advances to step 1225 where the eSIM Profile Creation Tool UI may propose data that should resolve the inconsistency and that the user may accept at step 1230. An example of a mismatch may include the user specifying that an eSIM profile is used to operate in a 5G Standalone network so the 5G SUCI calculation needs to be enabled in the eSIM Profile Template. If the default USIM Service Table ("UST") does not include the corresponding service of a 5G SUCI calculation in the user-entered data, the eSIM Creation Tool UI flags the mismatch and proposes to a user the correct data to be entered. This would be an example of an inconsistency that would create a real-time error alert to alert a user that information that he, or she, has entered has created an error situation that should be corrected before continuing to create an eSIM profile template based on erroneous information. It will be appreciated that other error situations may be detected in real-time by comparing information or data entered by a user to information specific to the WSP's private network that may not be something that would be revealed to a third-party SIM vendor if eSIM profiles were to be generated outside of the WSP's private network by a third-party SIM vendor, for example. Thus, providing real-time alerts of inconsistencies in data entry before attempting to generate eSIM profiles is an advantage that might not be possible when a system such as eSIM creation, generation, and management system 20 shown in FIG. 1 is not used within a WSP's secure private network 18.

If the user chooses not to accept data proposed via the eSIM Profile Creation Tool UI at step 1230, method 1200 returns to step 1215 where a user may enter data again.

If a user chooses to accept proposed data at step 1225, or if no inconsistency is detected at step 1220 method 1200 advances to step 1235. At step 1235 the user selects, by pressing a button, giving a voice command, providing a keystroke, or by other means the creation, or modification, of an eSIM template based on data entered at step 1215 or proposed at step 1225, which entered (or proposed and accepted) is stored in the eSIM Profile Template Repository 38 as shown in FIG. 3. Method 1200 ends at step 1240. It will be appreciated that eSIM Profile Creation Tool UI 34 shown in FIG. 3 may be implemented by running steps of method 1200.

Figure 13:
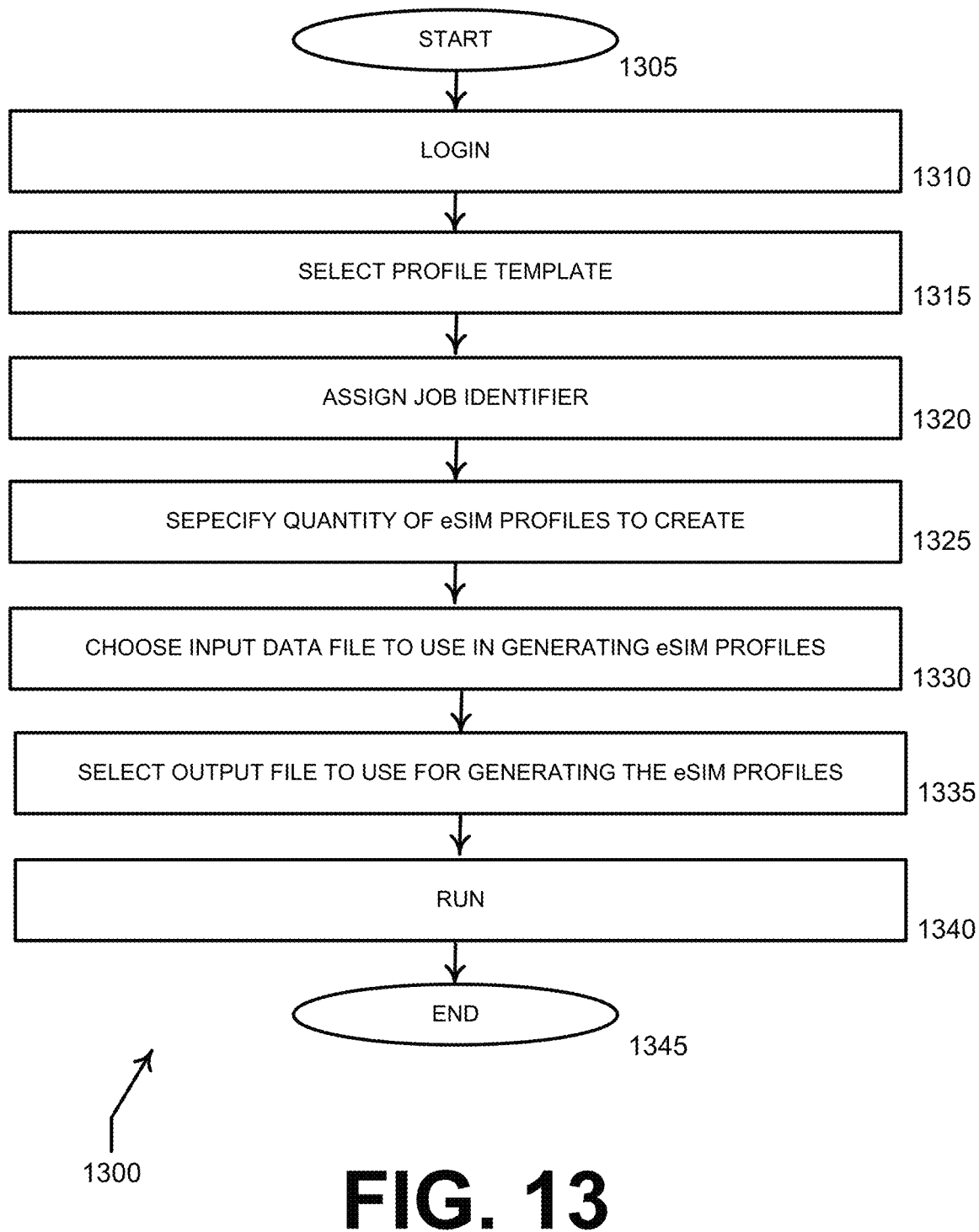
FIG. 13 illustrates a flow diagram of a method for creating one or more eSIM profiles using an eSIM generation tool wherein the eSIM generation tool is hosted within and operating from within a WSP's secure private network.

Turning now to FIG. 13, the figure illustrates a method 1300 for creating eSIM profiles. Method 1300 begins at step 1305. At step 1310 an authorized user logs in to the eSIM generation tool user interface. The user who logs in at step 1310 may not be the same user who logs in at step 1210 shown in FIG. 12. At step 1315 the user selects an eSIM profile template to use. At step 1320 the user assigns a job identifier. A job identifier may be a name, a number, or some other kind of unique indicator that references a particular run of eSIM profiles. At step 1325 the user specifies a quantity of eSIM profiles to be created. At step 1330 the user chooses an Input Data file from the WSP to use in conjunction with the eSIM profile template of step 1315 to generate eSIMs. At step 1335 the user selects an output file definition used for encrypting and securely storing each eSIM profile generated during the job run. At step 1340 the user runs the job and the method ends at step 1345.

Figure 14:
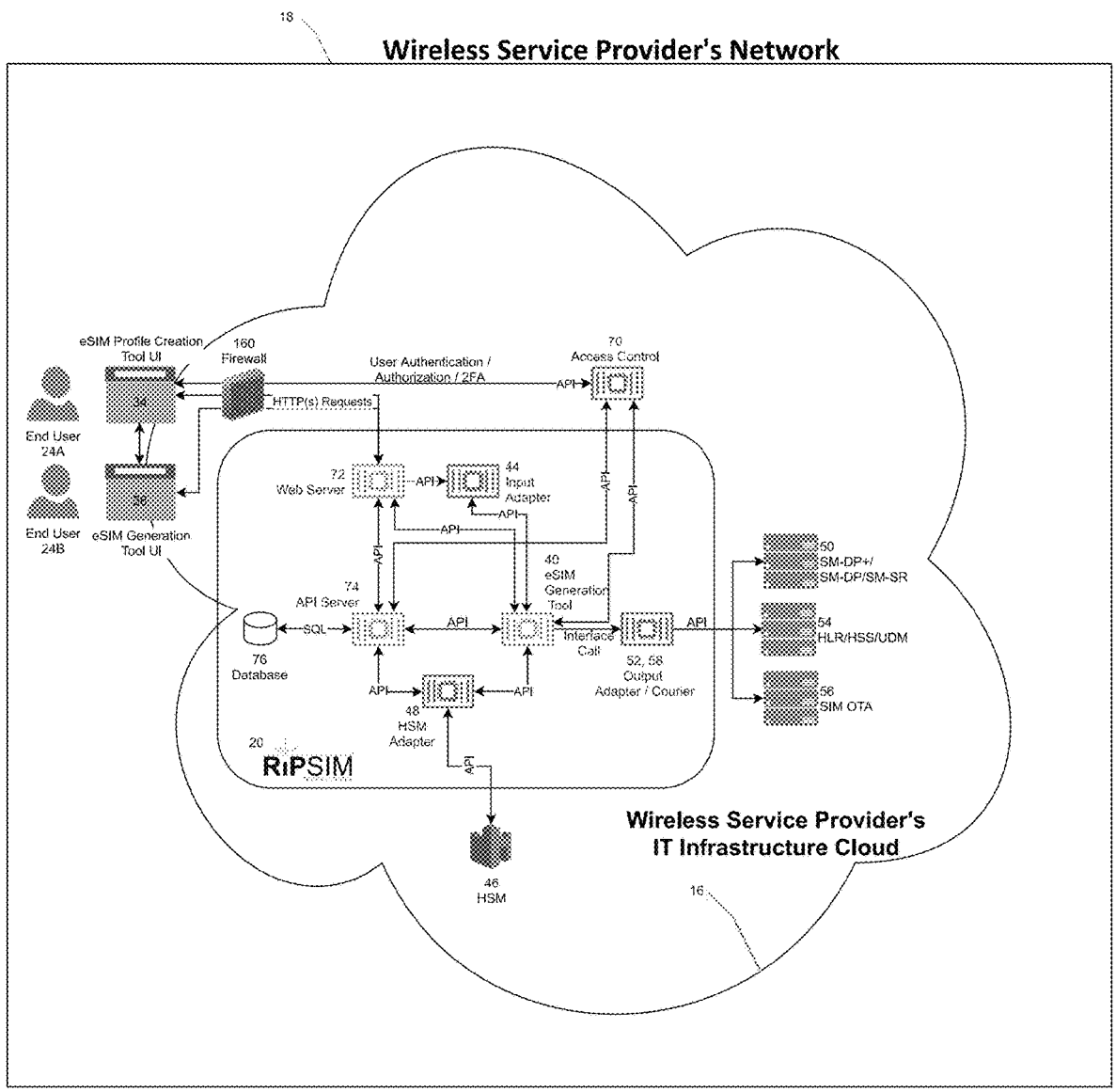
FIG. 14 illustrates a block diagram of a system architecture for designing eSIM profile templates and for generating eSIM profiles within a WSP's trusted, walled-garden, secure private network.

Turning now to FIG. 14, the figure illustrates a WSP's IT Infrastructure Cloud 16 and eSIM creation, generation, and management system 20 isolated by firewall 160. Firewall 160 may be a firewall service that segregates/isolates the eSIM creation, generation, and management system 20 from the rest of the WSP's IT infrastructure and that provides for added access control security, enabling only those authorized WSP personnel to use the eSIM creation, generation, and management system. Components shown inside the private cloud, including eSIM creation, generation, and management system 20, are part of the WSP's so-called 'walled garden' secure private network which the WSP maintains highly secure from devices that may try to gain access to a component, module, server, computer, interface, node, or other network component that comprises the private network. Self-contained eSIM creation, generation, and management system 20 includes components discussed elsewhere herein in more detail, including input file interface 44, output file interfaces 52 and 58, and Hardware Security Module ("HSM") interface 48. These interfaces/adapters facilitate communication between components of self-contained eSIM creation, generation, and management system 20 and WSP IT infrastructure components 22 that a WSP highly guards, such as, for examples, HSM 46, OSS/BSS interface to HLR/HSS/UDM 54, SM-DP+/SM-DP/SM-SR 50, and SIM-OTA 56, which components the WSP heretofore typically has not provided access to in generating eSIM profiles because eSIM profiles have been generated outside of the WSP's secure network by one or more third-party SIM vendors at various locations. Since self-contained eSIM creation, generation, and management system 20 facilitates users 24A (eSIM Profile Creation Tool User Interface users) and 24B (eSIM Generation Tool User Interface users) to access components of WSP's IT Infrastructure Cloud 16, which lies on one side of firewall 160, from computer devices that may be on the other side of firewall 160, adapters 44, 48, and 52, and 58 provide secure interfaces between eSIM Generation Tool 40 and the components corresponding to the various interfaces as shown in the figure. In addition, since heretofore (i.e., before the inventors of the present application created the aspects/embodiments disclosed herein) eSIM profiles and related information were typically loaded from either recordable memory/media, or were loaded to the various components, (e.g., HLR/HSS/ UDM 54, SM-DP+/SM-DP/SM-SR 50, and SIM-OTA 56), via middleware within WSP's IT Infrastructure Cloud 16, the eSIM profiles and related information that were created outside of the secure private network were typically already in a format needed for the various components 50, 54, and 56. Thus, interfaces 44, 48, 52 and 58 provide for and facilitate transferring information to the servers from eSIM Generation Tool 40 without disturbing the operation of the various components according to their respective previous modes, processes, techniques, and specifications of operations.

Self-contained eSIM creation, generation, and management system 20 also includes components such as web server 72, API server 74, and database 76. In an aspect, access control module 70 provides an authorization and authentication interface between users 24 A and B who may be authorized to access WSP's IT Infrastructure Cloud 16 such that credentials used by the users to access the WSP's IT Infrastructure Cloud 16 are also used to determine the level of functionality users 24A and 24B may have to eSIM creation, generation, and management system 20. The Access Control module 70 may be bundled as part of the eSIM creation, generation, and management system 20 or it may be an existing Open ID Connect/OAuth2 system of the WSP. As discussed elsewhere herein, if user 24A is a high security user, he, or she, may be able to access WSP's IT Infrastructure Cloud 16, and may be able to access the data entry section of the eSIM Profile Creation UI 34/web server 72 to enter sensitive data. Whereas other user(s) may be able to only access the Wizard mode of the eSIM Profile Creation UI 34/web server 72 to design or update an already-existing profile template.

Web server 72 may provide graphical user interfaces eSIM Profile Creation Tool UI 34 and eSIM Generation Tool UI 36 shown herein, as well as shown and described in reference to FIGS. 5-11. eSIM Profile Creation Tool UI 34 is a single-page application ("SPA") that allows users 24A to enter WSP onboarding data and build eSIM profile templates. eSIM Generation Tool UI 36 is a single-page application that allows users 24B to manage eSIM generation. Web server 72 may direct data entered via user interfaces 34 and 36 to the API server 74 or to the eSIM Generation tool 40 or, in cases of the sensitive data, via the HSM Adapter 48 directly to the HSM 46 for storage.

API server 74 may be a microservice that the eSIM Profile Creation UI 34 uses, for example, to manage eSIM profile templates and may interact with database 76 to store all of the onboarding data (except the aforementioned sensitive data which must be stored in HSM 46) entered by users 24A. API server 74 may also send the eSIM profile templates to the eSIM Generation Tool 40 via API. The specific API protocol that is used may vary depending on each individual WSP implementation and may be one of the following common API protocols: REST, SOAP or JSON-RPC. The database 76 may include a Relational database with a Structured Query Language ("SQL") API that may hold the eSIM profile templates and other meta information as required by API server 74.

The eSIM Generation Tool 40 may be a microservice that, upon request by user 24B, manages the generation of eSIMs. The eSIM Generation Tool 40 may interact with the eSIM Generation Tool UI 36 to collect data entered by the user 24B such as quantity of eSIMs and may interact with Input Adapter 44 to choose the requisite WSP Input Data needed during eSIM generation. Further, the eSIM Generation Tool 40 via the HSM Adapter 48 may interact with the HSM 46 to request cryptographic operations as needed during eSIM generation. Finally, the eSIM Generation Tool 40 may interact with the Output Adapter, an API that interfaces to WSP components 50, 54, and 56, to route output data to the corresponding WSP component. eSIM Generation Tool 40 may perform these functions during a single user session or during multiple user sessions.

The above description includes non-limiting examples of the various embodiments/aspects. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving one or more wireless subscriber eSIM profile template parameter selections via a user interface running on a user data entry computer device operative within a private network of a wireless service provider;
   automatically selecting a wireless subscriber eSIM profile template based on the wireless eSIM profile template parameter selections;
   generating a wireless subscriber eSIM profile according to the wireless subscriber eSIM profile template, wherein the wireless subscriber eSIM profile includes subscriber information that corresponds to a particular subscriber for use by a wireless subscriber device of the particular subscriber in wirelessly obtaining one or more services from the private network of the wireless service provider, using sensitive data of the wireless service provider that does not traverse a network edge of the private network of the wireless service provider; and
   causing the storing of the wireless subscriber eSIM profile at a network system component coupled to the private network of the wireless service provider for wireless download to a wireless subscriber device corresponding to the wireless subscriber eSIM profile,
   wherein the wireless subscriber eSIM profile is caused to be stored at the network system component a predetermined number of times for a predetermined plurality of eSIM profiles, wherein each eSIM profile includes unique data with respect to each of the other of the plurality of eSIM profiles.

2. The method of claim 1, wherein the subscriber information includes network authentication credential information for use in authenticating a wireless device to the private network of the wireless service provider.

3. The method of claim 1, wherein the receiving of the wireless subscriber eSIM profile template parameter selections, the automatic selecting of the wireless subscriber eSIM profile template, the generating of the wireless subscriber eSIM profile, and the causing of the storing of the wireless subscriber eSIM profile are performed by one or more components of the private network of the wireless service provider that are not accessible by computer devices that are not components of the private network of the wireless service provider.

4. The method of claim 1, wherein one or more wireless subscriber eSIM profile template parameters may include one or more of: Profile Header, Master File, CD, PINCodes, PUKCodes, TELECOM, USIM, OPT-USIM, Phonebook, GSM-Access, 5GS, SAIP, ISIM, OPT-ISIM, EAP, GenericFileManagement, AKAParameter, SecurityDomain, Application, Remote File Management, NonStandard or End.

5. The method of claim 1, wherein a user application running on the user data entry computer device provides the user interface that receives the wireless subscriber eSIM profile template parameter selections.

6. The method of claim 1, wherein user application running on the user data entry computer device is a browser.

7. A system for designing and generating eSIM profiles within a wireless service provider's secure private network, wherein secure information of the wireless service provider that is used for the generation of the eSIM profiles does not leave the secure private network, comprising:
   at least one computer component, operating within the secure private network and being logically isolated from computer components outside the secure private network, comprising at least one processor configured to:
      provide an eSIM profile creation tool interface that is configured to:
         receive onboarding data via a user interface running on a user data entry computer device coupled to the secure private network; and
         receive one or more wireless subscriber eSIM profile template parameter selections via a user interface running on a user data entry computer device coupled to the secure private network; and
      provide an eSIM generation tool to:
         use a selected wireless subscriber eSIM profile template determined based on the wireless eSIM profile template parameter selections;
         generate a wireless subscriber eSIM profile according to the selected wireless subscriber eSIM profile template, wherein the wireless subscriber eSIM profile comprises subscriber information that corresponds to a particular subscriber for use by a wireless subscriber device of the particular subscriber to wirelessly obtain one or more services from the secure private network of the wireless service provider, and wherein the secure information of the wireless service provider used to generate the eSIM profile comprises sensitive data of the wireless service provider that does not traverse a network edge of the private network of the wireless service provider; and cause the storing of the wireless subscriber eSIM profile, by a network system component coupled within the secure private network of the wireless service provider, to be capable to be wirelessly downloaded to a wireless subscriber device corresponding to the wireless subscriber eSIM profile, wherein the at least one computer component is configured to cause the storing of the wireless subscriber eSIM profile by the network system component a predetermined number of times for a predetermined plurality of eSIM profiles, wherein each eSIM profile includes unique data with respect to each of the other of the plurality of eSIM profiles.

8. The system of claim 7, wherein the secure information comprises Input Data.

9. The system of claim 8, wherein the Input Data is received by the at least one computer component from an Input Data server via an Input Data interface, wherein the at least one computer component, the Input Data server, and the Input Data interface are coupled within the secure private network.

10. The system of claim 9, wherein the Input Data adapter/interface includes an API.

11. The system of claim 7, wherein the network system component comprises at least one of: at least one HLR/HSS/UDM component, at least one SM-DP+/SM-DP/SM-SR component, at least one SIM-OTA component, or at least one OSS/BSS component.

12. A system, comprising:

an eSIM generation tool running on a computer device within a secure private network of a wireless service provider to:

use a selected wireless subscriber eSIM profile template that is created with onboarding data entered by a first user via an eSIM Profile Creation Tool user interface;

generate, in response to information entered by a second user via an eSIM Generation Tool User Interface that is hosted by a computer device operable within the secure private network of the wireless service provider, a wireless subscriber eSIM profile according to the selected wireless subscriber eSIM profile template, wherein the wireless subscriber eSIM profile includes subscriber information that corresponds to a particular subscriber for use by a wireless subscriber device of the particular subscriber to wirelessly obtain one or more services from the secure private network of the wireless service provider, and wherein the wireless subscriber eSIM profile is generated according to sensitive data of the wireless service provider that is not made available beyond a network edge of the secure private network of the wireless service provider; and cause the storing of the wireless subscriber eSIM profile by a network system component operable within the secure private network of the wireless service provider to be available to be wirelessly downloaded to a wireless subscriber device corresponding to the wireless subscriber eSIM profile, wherein the wireless subscriber eSIM profile is caused to be stored by the network system component a predetermined number of times for a predetermined plurality of eSIM profiles, wherein each eSIM profile includes unique data with respect to each of the other of the plurality of eSIM profiles.

13. The system of claim 12, wherein the first user may be a high security user and wherein the second user may not be a high security user.

14. The system of claim 12, further comprising a hardware security module interface between the eSIM generation tool and a hardware security module, wherein the hardware security module interface and the hardware security module are operated within, and are not accessible from outside of, the secure private network of the wireless service provider.

15. The system of claim 12, wherein the eSIM generation tool is further to:

generate the plurality of eSIM profiles according to a quantity entered by the second user via the eSIM Generation Tool User Interface, wherein the network system component is one of: an HLR/HSS/UDM component, an SM-DP+/SM-DP/SM-SR component, an SIM-OTA component, or an OSS/BSS component.

* * * * *